(12) United States Patent
Vogel et al.

(10) Patent No.: US 7,308,704 B2
(45) Date of Patent: Dec. 11, 2007

(54) DATA STRUCTURE FOR ACCESS CONTROL

(75) Inventors: Matthias Vogel, Saarbrücken (DE); Bernhard Drittler, Walldorf (DE); Markus Kupke, Dielheim (DE)

(73) Assignee: Sap AG, Walldorf ( * ) Notice: Subject to any disclaimer, the term of this patent is extended or adjusted under 35 U.S.C. 154(b) by 701 days.

(21) Appl. No.: 10/642,499

(22) Filed: Aug. 18, 2003

(65) Prior Publication Data

US 2005/0044426 A1  Feb. 24, 2005

(51) Int. Cl.
- G06F 17/00 (2006.01)
- H04K 1/00 (2006.01)
- H04L 9/00 (2006.01)

(52) U.S. Cl. ............................................. 726/2; 726/1
(58) Field of Classification Search .................. 705/64, 705/54; 726/1, 2
See application file for complete search history.

(56) References Cited

U.S. PATENT DOCUMENTS

| | | | |
|---|---|---|---|
| 5,539,906 A * | 7/1996 | Abraham et al. ............... 707/9 |
| 5,941,947 A | 8/1999 | Brown et al. | |
| 6,023,765 A | 2/2000 | Kuhn | |
| 6,088,679 A | 7/2000 | Barkley | |
| 6,470,339 B1 | 10/2002 | Karp et al. | |
| 6,470,353 B1 | 10/2002 | Yaung et al. | |
| 6,484,258 B1 | 11/2002 | Haverty | |
| 6,513,039 B1 | 1/2003 | Kraenzel | |
| 6,535,879 B1 | 3/2003 | Behera | |
| 6,539,380 B1 | 3/2003 | Moran | |
| 6,578,037 B1 | 6/2003 | Wong et al. | |
| 6,591,265 B1 | 7/2003 | Erickson et al. | |
| 2002/0026592 A1 | 2/2002 | Gavrila et al. | |
| 2002/0178119 A1 * | 11/2002 | Griffin et al. ................. 705/54 |

(Continued)

FOREIGN PATENT DOCUMENTS

EP  0697662  2/1996

(Continued)

OTHER PUBLICATIONS

Wikipedia on line Encyclopedia; URL: http://en.wikipedia.org/wiki/Relational_model (pp. 11 and 12) and http://en.wikipedia.org/wiki/Relational_database_management_system (p. 5).*

(Continued)

Primary Examiner—Gilberto Barron, Jr.
Assistant Examiner—Farid Homayounmehr
(74) Attorney, Agent, or Firm—Fish & Richardson P.C.

(57) ABSTRACT

Data structures for use in controlling access to data objects by users of a computer system or computing device are described. The data structures include an access control group data structure, a user access data structure, and a data object access data structure. The access control group data structure stores access control group data. The user access data structure stores user access data. The user access data relates to at least one entry in the access control group data structure. The data object access data structure stores data object access data, which relates to at least one entry in the access control group. Additional data structures described include an access control rule data structure and a characteristic method data structure.

15 Claims, 14 Drawing Sheets

U.S. PATENT DOCUMENTS

2002/0184535 A1    12/2002    Laracuente et al.

FOREIGN PATENT DOCUMENTS

| EP | 0913966 | 5/1999 |
|---|---|---|
| EP | 0 992 873 | 4/2000 |

OTHER PUBLICATIONS

Barkley, et al. "Managing Role/Permission Relationships Using Object Access Types," *Proceedings of the 3rd ACM Workshop on Role-Based Access Control*, New York, US, Oct. 22-23, 1998, pp. 73-80.

Deng, et al., "A Dynamic Access Control Model for Object-Oriented System," *Institute of Electrical and Electronics Engineers*, New York, US, Oct. 13-15, 1993, pp. 159-163.

Schaad, et al. "The Role-Based Access Control System of a European Bank: A Case Study and Discussion," *Proceedings of The 6th ACM Symposium on Access Control Models and Technologies*, Chantilly, VA, May 3-4, 2001, pp. 3-9.

Sandhu, et al. "Access Control: Principles and Practice," *IEEE Communications Magazine*, Sep. 1, 1994, vol. 32, No. 9, pp. 40-48.

"XACML: A New Standard Protects Content in Data Exchange," Jun. 24, 2003, 7 pages, reprinted from http://developer.java.sun.com/developer/technicalArticles/Security/xacml/xacml.html.

"Sun's XACML Implementation," Jun. 23, 2003 Update, 2 pages, reprinted from http://sunxacml.sourceforge.net.

"OASIS: XACML Implementers Guide," Hal Lockhart, ed., Jun. 12, 2002, 5 pages.

"OASIS: Web-Services Policy Language Use-Cases and Requirements, Working Draft 04," Tim Moses, ed., Apr. 16, 2003, 23 pages.

"OASIS: eXtensible Access Control Markup Language (XACML) Version 1.0, OASIS Standard," Simon Godik and Tim Moses, eds., Feb. 18, 2003, 132 pages.

\* cited by examiner

DATA STRUCTURE FOR ACCESS CONTROL

TECHNICAL FIELD

This description relates to managing information used to control access to data in a computer system.

BACKGROUND

Computer systems often are used to manage and process business data. To do so, a business enterprise may use various application programs running on one or more computer systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. A business enterprise often may have a large volume of data and a large number of users who access data to process business transactions or to analyze data.

It may not be desirable for all users of a computer system to have access to all data in a computer system. This may be particularly true when a computer system has a large number of users, a large volume of data, or both a large number of users and a large volume of data. This also may be particularly true when a computer system is accessible to users or other computer systems over a private or public network.

One approach to preventing access to some portions of data by some users while permitting access to the portions of data by other users is to assign to particular users access privileges to particular portions of data. An access control list may be used to identify the particular users that are permitted access to particular portions of data. Creating and updating an access control list so that the access control list accurately provides access to the appropriate portions of data to the appropriate users may be a burdensome and time-consuming process. One approach to reducing the burden of managing access control information is to use an access control list that provides users access to particular portions of data based on a user attribute that is shared by many users (rather basing access on a user identifier that is unique to each user).

SUMMARY

Generally, the invention automatically generates and stores access control information that identifies users that are permitted to access particular business objects used by a computer application. The generation of access control information is based on a characteristic that is shared by the user and the business object to be accessed. The characteristic may be, for example, an attribute or a method to determine a characteristic of a user and/or a characteristic of a business object. In another aspect, the invention identifies a data structure for storing access control information.

In one general aspect, data structures are stored on a computer-readable medium or included in a computer-readable propagated signal. The data structures may be used for access control to data objects by users of a computer system or computing device. The data structures include an access control group data structure, a user access data structure, and a data object access data structure. The access control group data structure stores access control group data. The user access data structure stores user access data. The user access data relates to at least one entry in the access control group data structure. The data object access data structure stores data object access data. The data object access data relates to at least one entry in the access control group data structure.

Implementations may include one or more of the following features. For example, at least one entry in the access control group data may include a characteristic for use in determining at least one entry in the user access data structure that relates to the at least one entry in the access control group data structure. At least one entry in the access control group data structure may include a characteristic for use in determining at least one entry in the data object access data structure that relates to the at least one entry in the access control group data structure. At least one entry in the access control group data structure may include (1) a user characteristic for use in determining at least one entry in the user access data structure that relates to the at least one entry in the access control group data structure, and (2) an object characteristic for use in determining at least one entry in the data object access data structure that relates to the at least one entry in the access control group data structure. At least one entry in the access control group data structure may include an indication of an access control rule for use in determining (1) at least one entry in the user access data structure that relates to the at least one entry in the access control group data structure, and (2) at least one entry in the data object data structure that relates to the at least one entry in the access control group data structure.

Regarding the data object access data structure, at least one entry in the data object access data may include an indication of action that is permitted to be performed on a data object identified in the at least one entry in the data object access data structure. Also considering the user access data structure, at least one entry in the user access data structure may include an indication of action that is permitted to be performed by a user identified in the at least one entry in the user access data structure on a data object identified in the at least one entry in the data object access data structure. The at least one entry in the data object access data structure may relate to the at least one entry in the user access data structure.

The data structures also may include an access rule data structure. The access rule data structure may store access control rule data. The access rule data may relate to at least one entry in the access control group data structure. At least one entry in the access rule data structure may include an indication of action that is permitted to be performed for at least one entry in the data object access data structure. At least one entry in the access rule data structure may include an indication of how to determine at least one entry in the data object access data structure that relates to at least one entry in the access control group data structure. At least one entry in the access rule data structure may include an indication of how to determine at least one entry in the user access data structure that relates to at least one entry in the access control group data structure.

Each of the access control group data structure, the user access data structure, and the data object access data structure are separately maintainable from each of the other data structures. Similarly, each of the user access data structure and the data object access data structure are separately maintainable from the other data structure. A change in the user access data stored in the user access data structure does not necessitate a change in the data object access data stored in the data object access data structure to maintain desired control over access by particular users to particular data objects. Similarly, a change in the data object access data stored in the data object access data structure does not necessitate a change in the user access data stored in the user access data structure to maintain desired control over access by particular users to particular data objects.

In another general aspect, other data structures are stored on a computer-readable medium or included in a computer-readable propagated signal. The data structures may be used for access control to data objects by users of a computer system or computing device. The data structures include an access control rule data structure and a characteristic method data structure. The access control rule data structure stores access control rule data, and the characteristic method data structure stores characteristic method data. The characteristic method data relates to at least one entry in the access control rule data structure.

Implementations may include one or more of the following features. The data structures may include a user data structure to store user data. At least one entry in the characteristic method data structure may include an indication of a method to determine a user characteristic associated with at least one entry in the user data structure. At least one entry in the access control rule data structure may include an indication of a criterion for use in eliminating at least one entry in the data object data structure when using the method to determine a user characteristic, as may at least one entry in the characteristic method data structure.

The data structure may include a data object data structure to store data object data. At least one entry in the characteristic method data structure may include an indication of a method to determine a data object characteristic associated with at least one entry in the data object data structure. At least one entry in the characteristic method data structure or the access control rule data structure may include an indication of a criterion for use in eliminating at least one entry in the data object data structure when using the method to determine a data object characteristic.

Implementations of the any techniques discussed above may include data structures stored on a computer-accessible medium, data structures on a propagated signal, or a system or an apparatus. The details of one or more implementations of the invention are set forth in the accompanying drawings and the description below. Other features, objects, and advantages of the invention will be apparent from the description and drawings, and from the claims.

DETAILED DESCRIPTION

Figure 1:
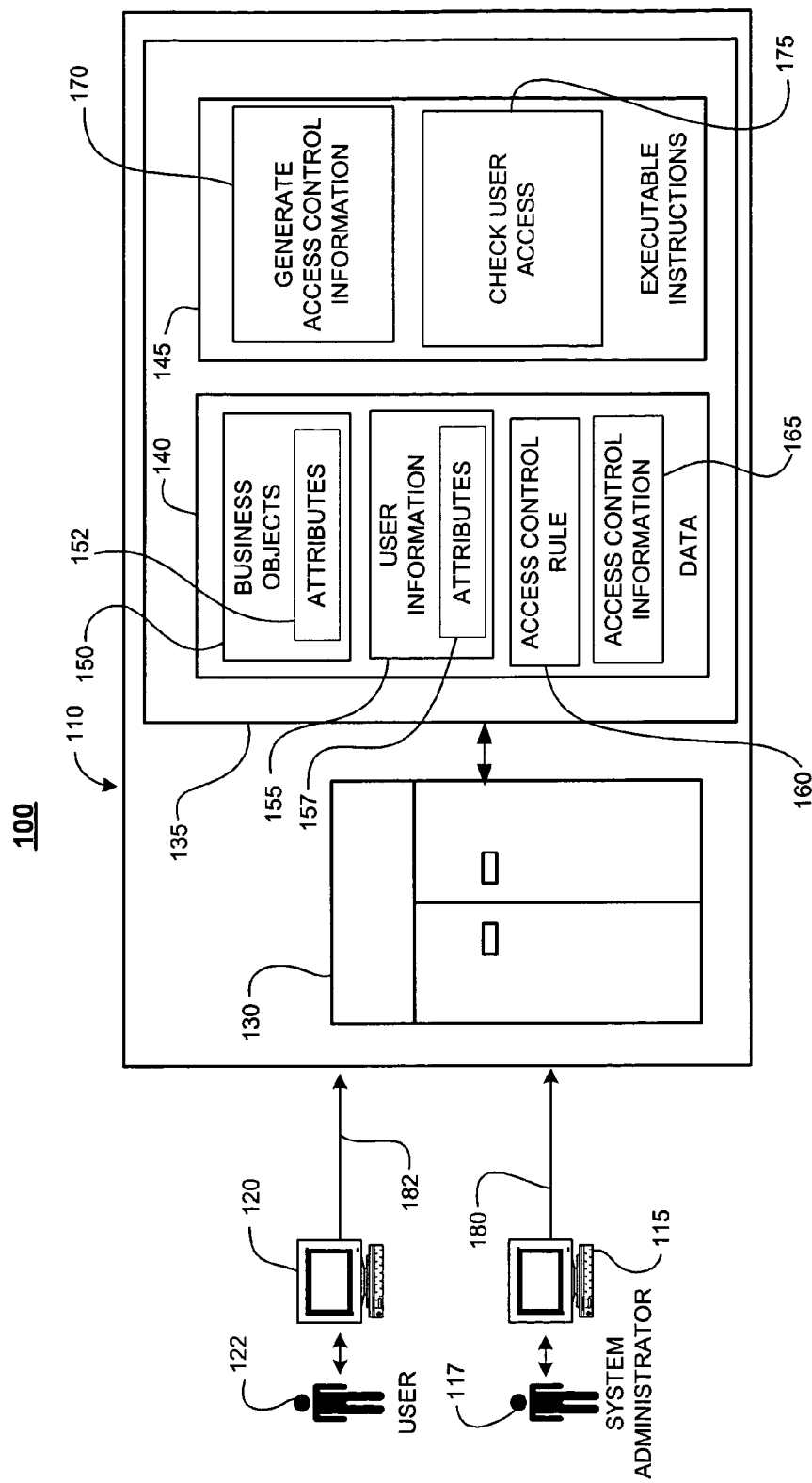
FIG. 1 is a block diagram of a system incorporating various aspects of the invention.

FIG. 1 shows a block diagram of a system 100 of networked computers that includes a computer system 110 for a business application. A user of the business application only is permitted to access a portion of the business data. The portion of the business data accessible to a user is based on a characteristic that is shared by the business data and the user. The characteristic can be an attribute that is directly or indirectly related to the user and an attribute that is directly or indirectly related to the business data.

The system 100 includes the computer system 110, a client computer 115 used by a system administrator 117 to administer the business application, and a client computer 120 used by a user 122 to access the business application. The computer system 110, the client computer 115 and the client computer 120 all are capable of executing instructions on data. As is conventional, the computer system 110 includes a server 130 and a data storage device 135 that is associated with the server 130. The data storage device 135 includes data 140 and executable instructions 145. A particular portion of data, here referred to as business objects 150, is stored in the computer system 110. The business objects 150 includes multiple business objects. Each business object in business objects 150 is a collection of data attribute values, and typically is associated with a principal entity represented in a computing device or a computing system. Examples of a business object include information about a customer, an employee, a product, a business partner, a product, a sales invoice, and a sales order. A business object may be stored, for example, as a row in a relational database table, an object in an object-oriented database, data in an extensible mark-up language (XML) file, or a record in a data file. Attributes 152 are associated directly or indirectly with each of the business objects 150. In one example, a customer business object may be associated with a series of attributes including a customer number uniquely identifying the customer, a first name, a last name, an electronic mail address, a mailing address, and a telephone number. In another example, a sales order business object may include a customer number of the purchaser, the date on which the sales order was placed, and a list of products, services, or both products and services purchased.

The computer system 110 also stores another particular portion of data, here referred to as user information 155. Like the business data 150, the user information 155 includes multiple user objects. Attributes 157 are associated with a portion of the user information 155. Each portion of user information is a collection of data attribute values associated with a particular user of the business application. Typically, a portion of user information is directly or indirectly associated with some attributes of attributes 152. One type of attribute is a user identifier that uniquely identifies a particular user. Another type of attribute associated with the user, for example, may be an organizational unit to which the user is assigned, the sales territory for which the user is responsible, or the name of the user. The user information may be stored as rows in a relational database table, objects in an object-oriented database, data in an extensible mark-up language (XML) file, or records in a data file.

The computer system 110 also stores access control rules 160 for generating access control information 165. The computer system 110 includes a process 170 for generating access control information 165 and a process 175 to check, using the access control information 165, whether a particular user is permitted access to a particular business object. The generate access control information process 170 includes executable instructions for automatically generating, based on a characteristic that is shared by a user and a business object, access control information 165 using access control rules 160, as described more fully below. The check user access process 175 includes executable instructions for determining, based on the generated access control information 165, whether a particular user is permitted access to a particular business object, as described more fully below.

The computer system 110 and the client computers 115 and 120 may be arranged to operate within or in concert with one or more other systems, such as, for example, one or more LANs ("Local Area Networks") and/or one or more WANs ("Wide Area Networks"). Each of the client computers 115 or 120 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). The client computer 115 uses a wired or wireless communication pathway 180 to communicate with the computer system 110, and the client computer 120 uses a wired or wireless communication pathway 182 to communicate with the computer system 110. For brevity, FIG. 1 illustrates only a single system administrator computer 115 and a single user computer 120 for system 100.

In general, the system administrator defines access control rules 160 to identify a characteristic shared by a user and a business object on which access to the business object is to be determined. The computer system 110 automatically generates, based on a shared characteristic, access control information that identifies the particular users that are permitted access to a particular business object. This may be accomplished, for example, through the use of a task scheduler (not shown) that initiates the automated access control generation process 170 at a particular day and time. In general, the generate access control information process 170 uses the access control rules 160, attributes 152 of business objects 150, and attributes 157 of user information 155 to generate access control information 165 that identifies the particular users that are permitted to access particular business objects. The generate access control information process 170 may be scheduled as a recurring event based on the occurrence of a predetermined time or date (such as each night or every Saturday at one o'clock a.m.). Examples of automated generate access control information processes are described more fully in FIGS. 3, 9 and 10.

The ability to automatically generate access control information for a business application may be useful. This may be particularly true in a business enterprise that has a large number of users (perhaps, thousands, or tens of thousands, of users) and/or a large number of business objects (perhaps, even millions of business objects) to which each user needs to be granted permission in order to access. The burden of assigning each user identifier to each business object that the user is permitted to access may be so large in some cases as to prohibit the ability of a business enterprise to adequately restrict user access to data.

Figure 2:
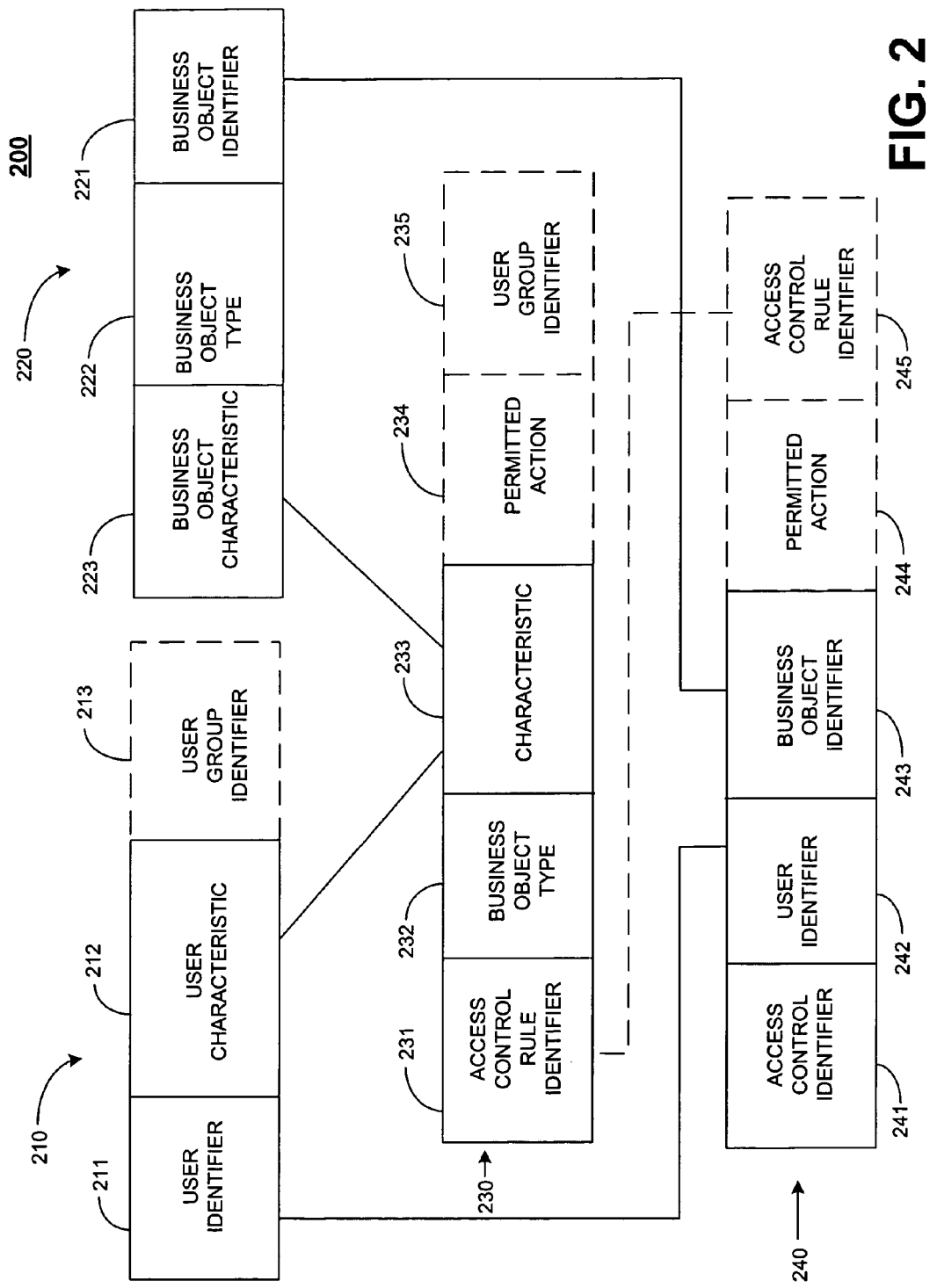
FIGS. 2, 7 and 8 are block diagrams illustrating example data structures for use in automatically generating access control information and using the generated access control information.

FIG. 2 shows an example of a data structure 200 that can be used for automatically generating, based on a characteristic shared by the user and the business object to which access is sought, access control information and using the generated access control information for determining whether a particular user is permitted to access a particular business object. The data structure 200 includes user information 210 that may be, for example, an implementation of user information 155 in FIG. 1. The user information 210 includes a user identifier 211 that uniquely identifies information associated with a particular user, a user characteristic 212 and, optionally, a user group identifier 213. The user characteristic 212 is an attribute or attributes that are associated with the user. For example, the user characteristic 212 may be a unique identifier of an organizational unit, such as a department, to which the user is assigned or may be a unique identifier of a geographic territory, such as a sales territory, over which the user is responsible. The optional user group identifier 213 uniquely identifies a particular user group to which the user is assigned. A user group is a collection of users that share a common characteristic or attribute. For example, a user group may be "managers" that is associated with a user who is a manager. Another user group may be "sales employees" that is associated with a user who is a sales employee.

The data structure 200 also includes a business object information 220 that may be, for example, an implementation of business information 150 in FIG. 1. The business object information 220 includes a business object identifier 221 that uniquely identifies information associated with a particular business object, a business object type 222 and a business object characteristic 223. The business object type 222 identifies a group of business objects of a particular type, such as a sales order, an employee, or product information. The business object characteristic 223 is an attribute that is (or attributes that are) associated with the business object. For example, the business object characteristic 223 may be a unique identifier of an organizational unit (such as a department) or a unique identifier of a geographic location to which the business object is associated (such as the geographic area in which a sale occurred).

The data structure 200 also includes access control rule information 230 that may be, for example, an implementation of access control rules 160 in FIG. 1. The access control rule information 230 includes an access control rule identifier 231 that uniquely identifies a particular access control rule, a business object type 232 that identifies a business object type to which the rule applies, a characteristic 233, an optional permitted action 234, and an optional user group identifier 235.

The characteristic 233 identifies the characteristic that the user and the business object each must have for the user to be permitted to access the business object. In one example, the characteristic 233 may be a particular organizational unit. When the user characteristic 212 of a particular user and the business object characteristic 223 both correspond to the characteristic 233 of the access control rule information 230, the user is permitted to access the particular business object. The characteristic 233 may be an attribute, an attribute and a corresponding attribute value, or a method of determining whether the user and the business object both have a characteristic. When an attribute only is identified in characteristic 233, the value of the attribute associated with the user must correspond to the value of the attribute associated with business object. The ability to identify a characteristic as an attribute (rather than an attribute and a particular value that the attribute must have) may help reduce the amount of user manipulation required to define access control rules. For example, a system administrator only identifies a particular attribute (such as an organizational unit or a sales territory) rather than identifying separate rules for each value for the attribute. Thus, a system administrator may identify a single rule having an attribute for organizational unit (or sales territory attribute) rather than defining many rules, each of which identifies a particular value of the organization unit (or sales territory).

The optional list of permitted actions 234 identifies the action or actions that a user may perform on the business object. Permitted actions may be one or more of a type of database operation (such as read, write, or delete) or may be another type of action, such as access permitted to copy the business object.

The user group identifier 235 optionally identifies the user group to which a user must belong to receive access to the business object. The optional user group identifier 235 may be used to provide a filter condition that reduces the amount of user information 210 processed to generate access control information. This may be accomplished, for example, when access control information is only generated for a subset of the user information that belong to the user group identified by the user group identifier 235. This capability may be particularly useful in an computer system that includes a large number of users.

The data structure 200 also includes access control information 240 that may be, for example, an implementation of access control information 165 in FIG. 1. The access control information 240 includes a record for each user that is permitted to access a particular business object. The access control information 240 includes an access control identifier 241, a user identifier 242, a business object identifier 243, an optional indication of permitted action 244, and an optional access control rule identifier 245. The access control identifier 241 uniquely identifies a particular access control record, and the user identifier 242 identifies a user that is permitted to access the business object identified by the business object identifier 243. The access control information 240 optionally includes an indication of the permitted action 244 or actions that the user is permitted to perform on the business object.

The access control information 240 also optionally includes an access control rule identifier 245 that identifies the access control rule used to generate the particular record in the access control information 240. By storing the access control rule identifier 245 in the access control information 240, the capability is provided to identify the particular access control rule used to generate the record of access control information. The capability (which may be referred to as traceability) may enable the selective creation or update of access control information when an access control rule is modified or deleted. This may be particularly useful when a computer system includes a large number of users, a large volume of data, or both a large number of users and a large volume of data.

When the access control rule information 230 includes an indication of permitted actions 234, an access rule identifier 245 for a particular access control information record may be able to identify permitted action from the access control rule information 230 even when the list of permitted actions 244 are not included in the access control information 240. This may be accomplished by identifying the indication of permitted action 234 in the access control rule based on the access control rule identifier 245 in the access control information 240.

In some implementations, the indication of permitted actions 234 in the access control rule information 230 and the indication of permitted actions 244 in the access control information 240 may correspond even when the permitted actions are represented in a different manner. For example, the access control rule information 230 may include an indication of permitted action 234 that are more easily understood by a system administrator (who is responsible for creating and updating the access control rules) than the indication of permitted actions 244 in access control information 240 that may be represented as permitted data operations. The indication of permitted action 234 in access control rule information 230 may include options of view, modify and archive that is easily understood by a system administrator defining an access rule, whereas the indication of permitted action 244 in the access control information 240 may include options of read, write and delete that correspond to database operations. In such a case, for example, the view option may correspond to the read operation; the modify option may correspond to the read operation and write operation; and the archive option may correspond to the read operation, write operation, and delete operation.

Figure 3:
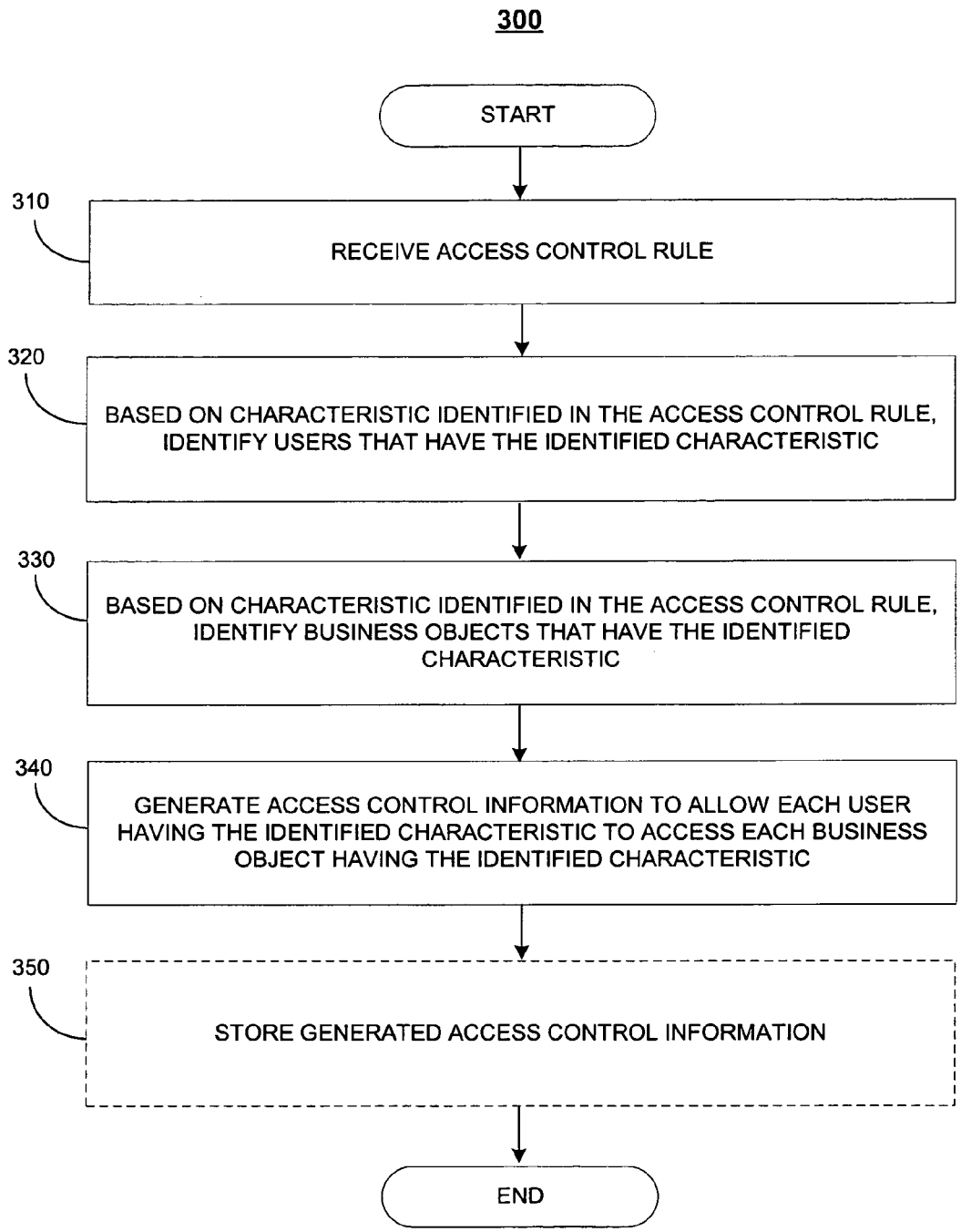
FIGS. 3, 9 and 10 are flow charts of processes for generating access control information.

FIG. 3 illustrates an automated process 300 for generating access control information. The automated process 300 may be performed by a processor on a computing system, such as the computer system 110 of FIG. 1. The processor is directed by a method, script, or other type of computer program that includes executable instructions for performing the generate access control information process 300. An example of such a collection of executable instructions is the generate access control information process 170 of FIG. 1.

The automated process 300 may begin at a predetermined time and date (typically a recurring predetermined time and date), may begin when a predetermined condition is met (such as the definition of a new access control rule), or may be manually initiated by a system administrator or another type of user. The processor receives an access control rule (step 310). In one example, the processor receives from a calling software module or other type of executable software a particular access control record (such as a record from the access control rule information 230 in FIG. 2). Alternatively, the processor may access a particular access control record stored in access control rule information, such as access control rule information 230 in FIG. 2, based on an access control rule identifier received by the processor.

The processor identifies, based on the characteristic identified in the received access control rule, users that have the identified characteristic (step 320). This may be accomplished, for example, by determining records in the user information 210 that include a user characteristic 212 that corresponds to the characteristic 233 in the access control rule information 230.

The processor identifies, based on the characteristic identified in the received access control rule, business objects that have the identified characteristic (step 330). This may be accomplished, for example, by determining records in the business object information 220 that include a business object characteristic 223 that corresponds to the characteristic 233 in the access control rule information 230.

The processor then generates access control information to allow each user having the identified characteristic (and identified in step 320) to access each business object having the identified characteristic (and identified in step 330). Each combination of a user and a business object that is generated may be referred to as a user-business-object pair—that is, a user identifier and a business object identifier for a particular access control information record. The generation of the access control information may be accomplished, for example, by the processor generating a record of access control information 240 for each user-business-object pair. The processor may generate an unique access control identifier 241, associate the user identifier 242 that corresponds to the user identifier 211 of the user information for the user of the user-business-object pair, and associate the business object identifier 243 that corresponds to the business object identifier 221 for the business object of the user-businessobject pair. When access control rule information includes an indication of permitted action 234, the indication of permitted action 244 may be associated with the access control information record. Some implementations may associate the access control rule identifier 231 of the access control rule received in step 310 with the generated access control information.

The processor optionally stores the generated access control information in persistent storage (step 350). For example, the generated access control information 240 may be stored with the access control information on a data storage device, such as the access control information 165 stored on the data storage device 135 associated with the computer system 110 in FIG. 1.

Figure 4:
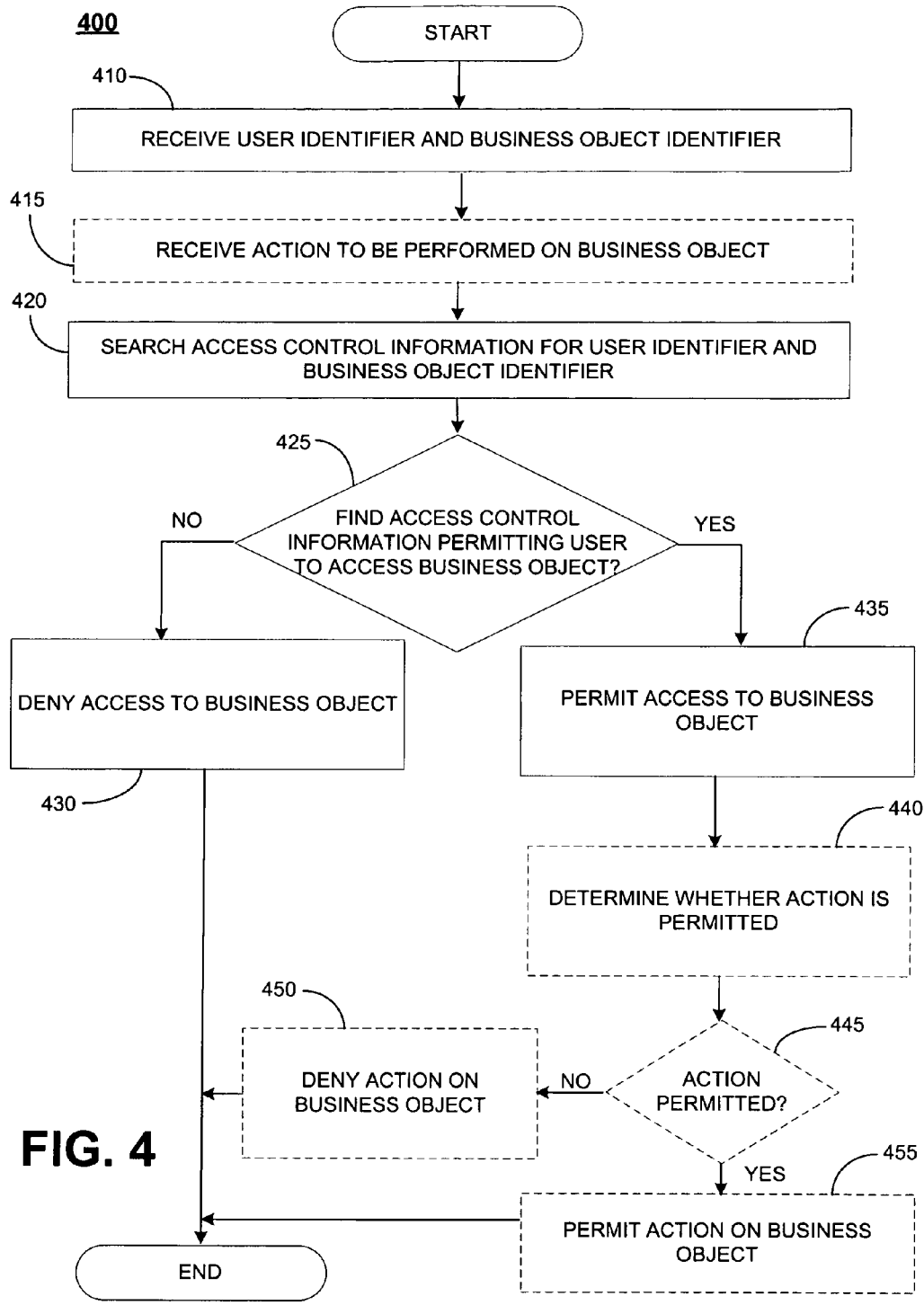
FIGS. 4 and 13 are flow charts of processes for checking whether a particular user is permitted to access a particular business object.

FIG. 4 illustrates a process 400 for using access control information to check whether a particular user is permitted to access a particular business object. The process 400 may be performed by a processor on a computing system, such as the computer system 110 of FIG. 1. The processor is directed by a method, script, or other type of computer program that includes executable instructions for performing the check user access process 400. An example of such a collection of executable instructions is the check user access process 175 of FIG. 1.

The process 400 may be initiated by another software module or other type of executable software when a user seeks to access a particular business object. The processor receives a user identifier and a business object identifier (step 410). This may be accomplished, for example, when the computer program that initiates the check access control process 400 provides a user identifier and a business object identifier to the processor when the check user access process 400 is initiated. Optionally, the processor receives an action to be performed by the user on the business object (step 415). In some cases, a received action may include multiple actions. In one example, the received action may include both a read operation and a write operation or may include a read operation, a write operation and a delete operation.

The processor then searches access control information to identify a record that includes both the user identifier and the business object identifier (step 420). An access control information record that includes the user identifier and the business object identifier indicates that the user is permitted to access the business object identified by the business object identifier.

When the processor does not find access control information that permits the user to access the business object (step 425), the processor does not permits access to the business object (step 430). This may be accomplished, for example, by the processor returning to the initiating software module or other type of executable software an indication that the user is not permitted access to the business object. The processor then ends the process 400.

When the processor finds access control information that permits the user to access the business object (step 425), the processor permits access to the business object (step 435). This may be accomplished, for example, by the processor returning to the initiating software module or other type of executable software an indication that the user is permitted access to the business object.

Some implementations also may determine whether a requested action is permitted on the business object. In such a case, the processor determines whether the received action is permitted (step 440). To do so, for example, the processor may determine whether the received permitted action corresponds to a permitted action included in the indication of permitted action 244 in the access control information 240. This may involve, for example, accessing a table that translates a value of a received permitted action to the corresponding value or values of permitted actions in the access control information, as described in FIG. 2 with respect to translating an indication of permitted actions 234 in the access control rule information 230 to an indication of permitted action 244 in the access control information 240. When the requested action is not permitted (step 445), the processor denies the action on the business object (step 450), whereas when the requested action is permitted (step 445), the processor permits the action to occur on the business object (step 455). An indication whether the user is permitted to perform the requested action on the identified business object, for example, may be provided to the initiating software module or other type of executable software.

Figure 5:
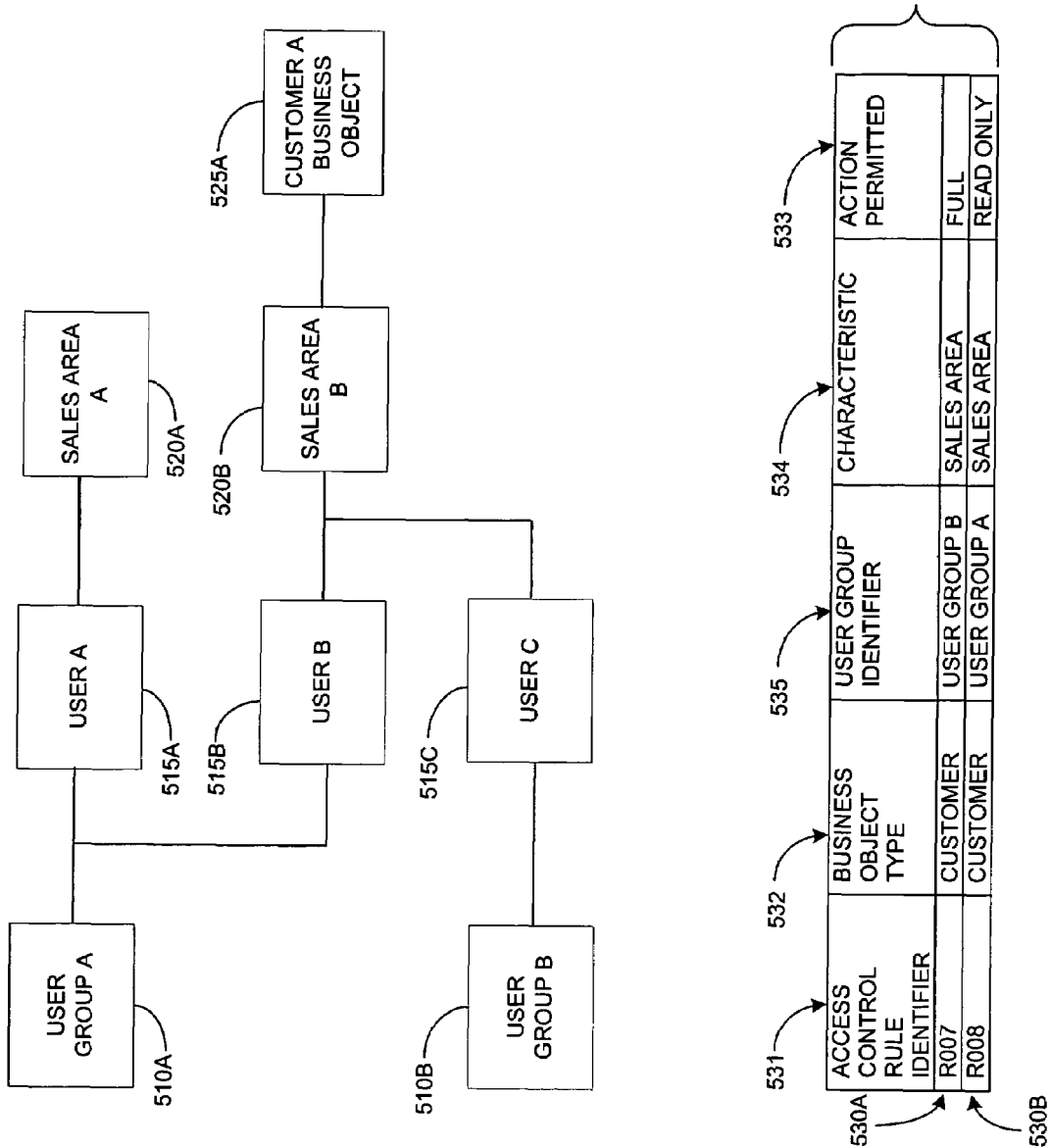
FIGS. 5, 11A, 11B and 12 are block diagrams of representations of example access control information, user information, and business object information.

FIG. 5 shows a representation 500 of user information, sales area information, business object information and access control rule information. The user information includes two user groups 510A and 510B. The user group 510A includes two users 515A and 515B, whereas user group 510B includes user 515C. Sales area information includes two sales areas 520A and 520B. User 515A is assigned to sales area 520A, whereas users 515B and 515C both are assigned to sales area 520B. The business object information includes a customer business object 525A that is assigned to sales area 520B.

The access control rule information 530 includes two rules 530A and 530B for permitting access to a customer business object, as shown by the business object type 532 having a value of "CUSTOMER" for each of rules 530A and 530B. According to rule 530A, users who (1) are associated with the user group identifier 510B that correspond to the user group identifier 535 of rule 530A (that is, "USER GROUP B") and (2) share the characteristic 534 of "SALES AREA" with a customer business object may access the customer business object to perform the actions that are included in permitted action 533 (here, "FULL"). Therefore, according to rule 530A, user 515C may access the customer business object 525A to perform any of the actions permitted by "FULL" access. This is because user 515C (1) is associated with of the user group 510B (that is, "USER GROUP B") and (2) shares the characteristic "SALES AREA" with the customer business object 525A—that is, the user 515C and the customer business object 525A both are associated with the same sales area (here, sales area 520B). The users 515A and 515B are not permitted full access to the customer business object 515A.

According to rule 530B, users who (1) are associated with the user group identifier 510A that correspond to the user group identifier 535 of rule 530B (that is, "USER GROUP A") and (2) share the characteristic 534 "SALES AREA" with a customer business object may access the customer business object to perform the actions that are include in permitted action 533 for the rule 530B (here, "READ ONLY"). Therefore, according to rule 530B, user 515B may access the customer business object 525A to perform "READ ONLY" action. This is because user 515B (1) is associated with the user group 510A (that is, "USER GROUP A") and (2) shares the characteristic "SALES AREA" with the customer business object 525A—that is, the user 515B and the customer business object 525A both are associated with the same sales area (here, sales area 520B). The user 515A is not permitted full access to the customer business object 515A. According to rule 530B, user 515C is not permitted "READ ONLY" access to the customer business object 525A; however, user 515C is permitted, based on rule 530A, "FULL" access (which includes read access) to the customer business object 515A, as described above.

Figure 6:
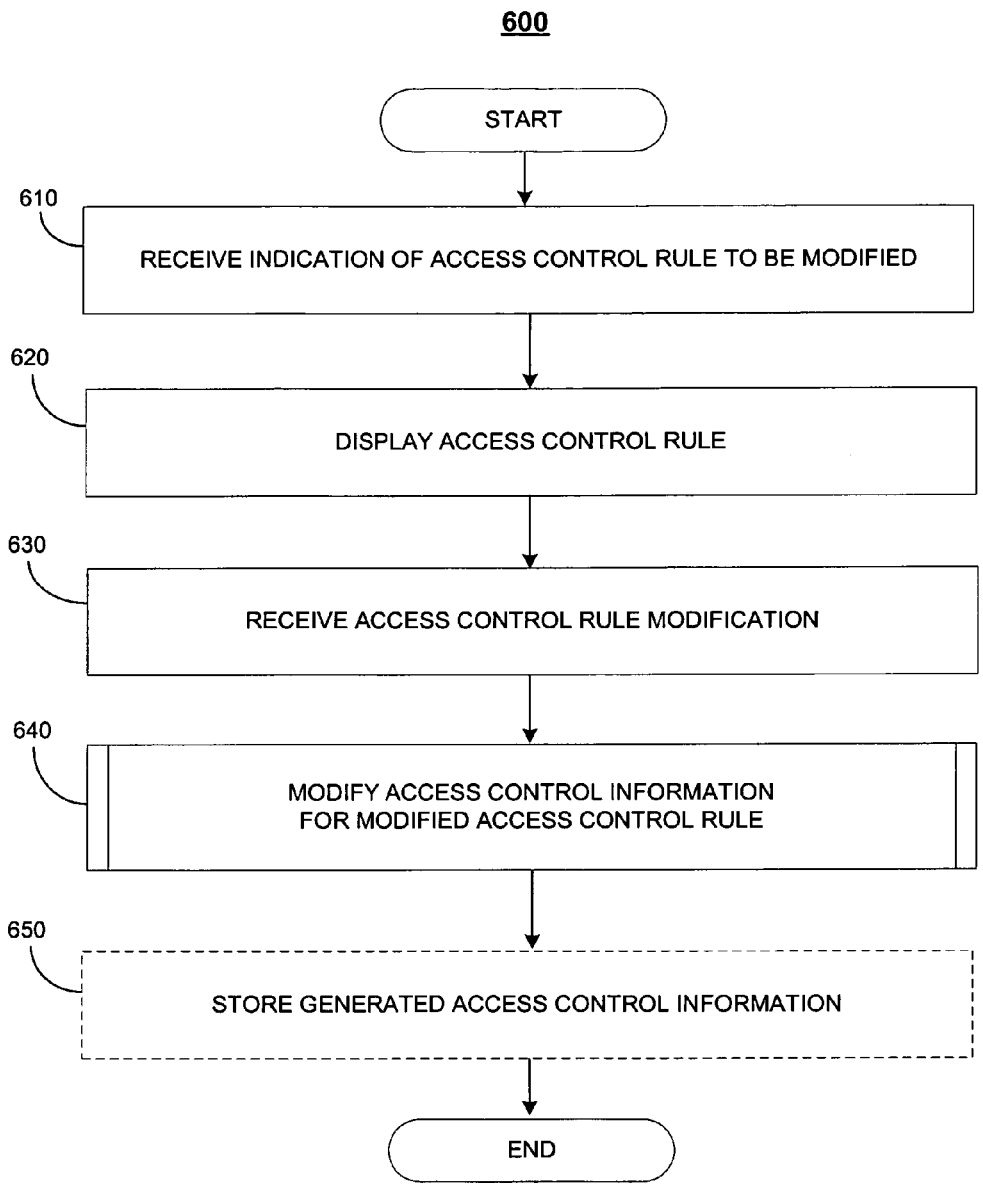
FIG. 6 is a flow chart of a process for modifying an access control rule that is used to generate access control information.

FIG. 6 depicts a process 600 for modifying an access control rule and modifying access control information based on the modified access control rule. The process 600 may be performed by a processor on a computing system, such as the computer system 110 of FIG. 1. The processor is directed by a method, script, or other type of computer program that includes executable instructions for performing the process 600.

The process 600 is initiated by a system administrator or another type of user who seeks to modify a particular access control rule. The user uses a computer system, such as client computer system 115 in FIG. 1, to identify a particular access control rule to be modified. The processor receives an identification of the particular access control rule to be modified (step 610). This may be accomplished, for example, when the user uses a computer interface to select a particular access control rule from a list of access control rules. The user may use a pointing device to select the particular access control rule. The processor receives the indication of the particular access control rule from the input of the pointing device. The processor then may retrieve the access control rule information that corresponds to the selected access control rule, for example, by using the identifier, such as the access control rule identifier 231 in FIG. 2, to locate and retrieve the selected access control rule.

The processor displays the access control rule on a display device that is associated with the computer that the user is using (step 620). The user then may use an input device to enter a modification to the access control rule. The processor receives the access control rule modification (step 630).

The processor generates access control information for the modified access control rule (step 640). This may be accomplished, for example, in a manner similar to the process 300 for generating access control information. The process optionally stores the generated access control information in persistent storage (step 650).

In one example of process 600, a user modifies access control rule 530B in FIG. 5 to permit the action of "CHANGE" which permits a user to perform read and write operations on any business object that is accessible to the user (but not perform a delete operation that would also be permitted if the user were granted "FULL" action). The user identifies access control rule 530B, and the processor receives the access control rule identifier 531 (step 610). The processor, based on the received access control rule identifier 531, displays the access control rule 530B (step 620) and receives the modification of the permitted action 533 to "CHANGE" (step 630).

The processor then modifies the access control information to reflect the modified access control rule (step 640). When the access control information includes an access control rule identifier 245, the processor is able to identify each access control information record that includes an access control rule identifier 245 that corresponds to the access control rule being modified. The processor updates each corresponding access control information record to include the modified permitted action 244 of "CHANGE."

In contrast, when the access control information does not include an access control rule identifier 245, the processor identifies each user and each business object that shares the characteristic of the modified access control rule. This may be accomplished in a manner similar to identifying each user-business-object pair as described previously in step 340 in FIG. 3. The processor then modifies the access control information records that correspond to each identified user-business-object pair such that the access control information records include the modified permitted action 244 of "CHANGE." Therefore, the use of an access control rule identifier 245 may reduce the system resources and time required to update access control information.

Other types of modification of an access control rule also may be performed. For example, a characteristic that must be shared by a user and a business object may be modified. In such a case, for example, the processor deletes the access control records that correspond to the unmodified access control rule and generates access control information records that correspond to the modified characteristic in the access control record.

Figure 7:
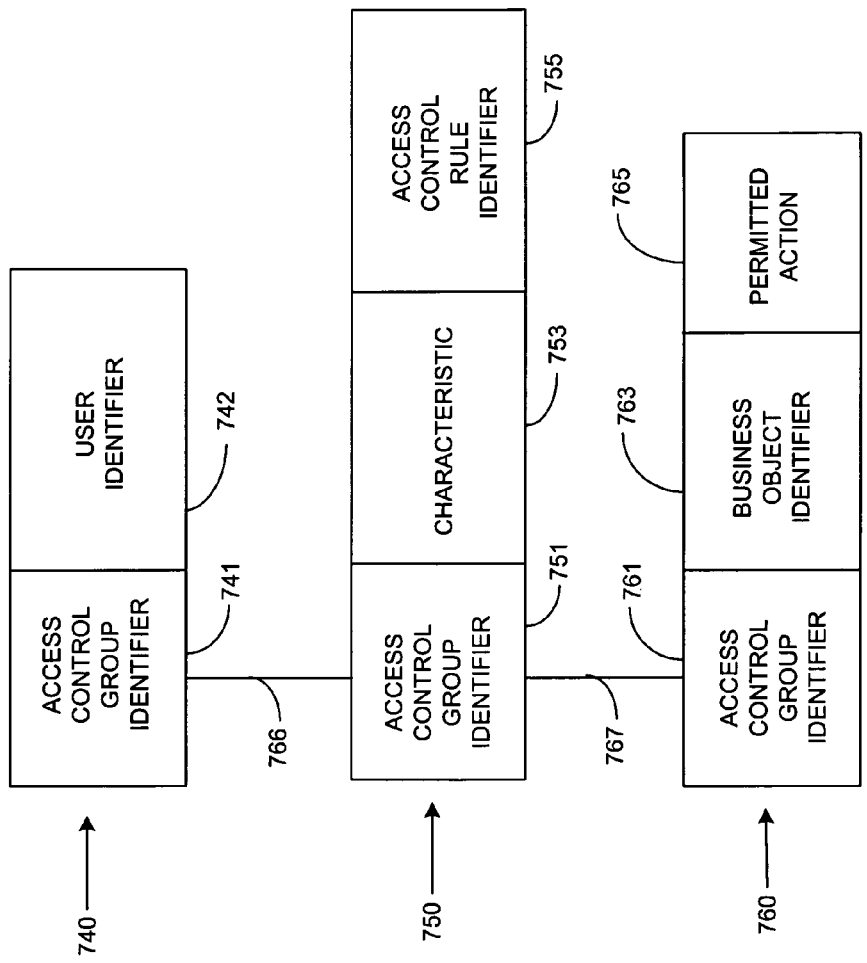

FIG. 7 illustrates another example data structure 700 for access control information. In contrast to the data structure of access control information 240 in FIG. 2, the access control information data structure 700 includes three data structures 740, 750 and 760 for access control information. The data structures 740, 750 and 760 are related through the use of an access control group identifier 741, 751 and 761, respectively, that associates information in each of the three data structures 740, 750 and 760, as shown by links 766 and 767.

The user context data structure 740 includes an access control group identifier 741 that uniquely identifies the group of access control information to which the user context data structure 740 relates. The user context data structure 740 also includes a user identifier 742 that identifies the user that is permitted to access the business object identified by the access control list 760, as described more fully below. The user context data structure 740 may be an example of a user access data structure. The access control group data structure 750 includes an access control group identifier 751 to identify the access control group to which the access control group data structure 750 relates, a characteristic 753 that identifies the characteristic that is shared by a user and a business object to which the user is permitted access. As described previously, the characteristic may be a characteristic attribute, a characteristic attribute and a characteristic value for the identified attributed, or a method for determining whether a user and a business object share a characteristic. In some implementations, the characteristic 752 may be a type of characteristic. In some implementations, particularly when the characteristic 753 is a type of characteristic or an attribute, the characteristic 753 may be referred to as an actor. The actor may include, for example, the identifier for an organizational unit, a sales territory that encompasses a defined geographic area, or a zip code. The access control group data structure 750 also includes an access control rule identifier 755 that identifies the access control rule for which the access control group relates.

The access control list 760 includes an access control group identifier 761 to identify the access control group to which the access control list data structure 760 relates, a business object identifier 763 that identifies the business object to which access is permitted. The access control list 760 also includes an indication of permitted action 765. The access control list 760 may be an example of a data object access data structure.

In general, the data structures 740, 750 and 760 may be used to determine whether a particular user is permitted to access a particular business object. When the access control group identifier 741 of a record in the user context data structure 740 corresponds to the access control group identifier 761 of a record in the access control list data structure 760, the user identified in the user context data structure 740 is permitted access to the business object identified in the access control list data structure 760. Examples of ways in which the data structures 740, 750 and 760 may be used to manage access control information are illustrated in FIGS. 9-13.

In some implementations, a user context data structure 740 also may include an indication of permitted actions (not shown). The indication of permitted actions may be used to control the types of actions that are permitted by a user in lieu of the permitted action 765 associated with the access control list 760. In such a case, a user may be permitted to perform any of the indicated actions associated with the user context data structure 740 for any business object to which the user has access. This may be referred to as an access control override setting. The use of such an override setting may be particularly useful to users who are system administrators who are permitted particular actions for all business objects in a particular business application.

Figure 8:
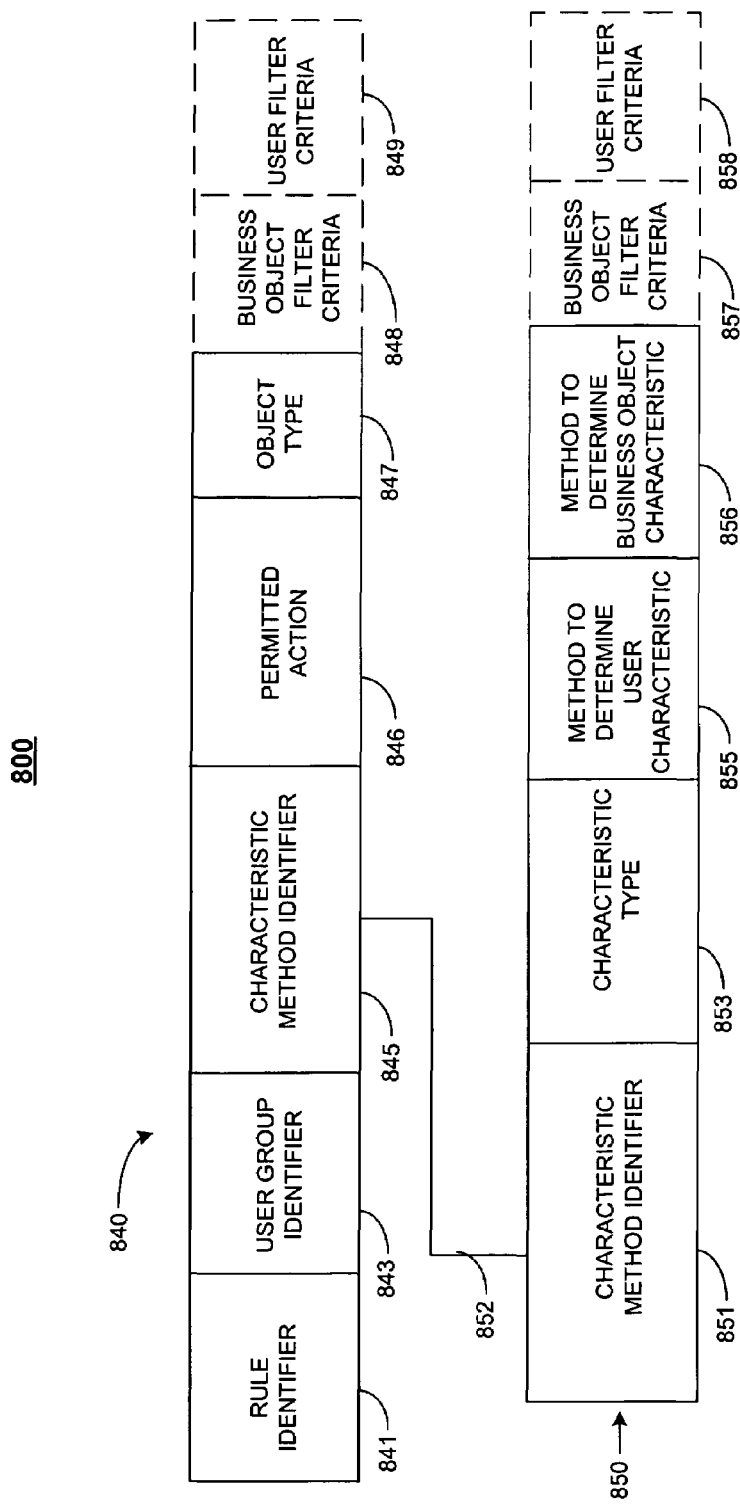

FIG. 8 illustrates an example data structure 800 for access control rule information. In contrast to the data structure of access control rule information 230 in FIG. 2, the access control rule information data structure 800 includes data structures 840 and 850 for use in the definition and storage of access control rule information. In general, the data structure 840 is an example of a data structure for access control rule information that identifies a user group, a object type, and a permitted action. The data structure 850 is an example of a characteristic method data structure that identifies particular methods for determining a user characteristic and a business object characteristic. The separation of the method for identifying a characteristic from the access privilege information of the user group, the business object type and permitted action may be useful. For example, a particular characteristic method record may be used by more than one access control rule. The ability to reuse particular characteristic methods may result in improved maintainability of the access control rule information. The data structures 840 and 850 are related through the use of a characteristic method identifier 845 and 851, respectively, that associates information in each of the data structures 840 and 850.

The rule data structure 840 includes a rule identifier 841 that uniquely identifies a particular rule record in the rule data structure 840. The rule data structure 840 also includes a user group identifier 843, a characteristic method identifier 845, an indication of permitted action 846, an object type 859, optional business object filter criteria 848, and optional user filter criteria 849. The user group identifier 843 identifies a user group to which a user must be associated with to obtain the permitted action 846 access to a business object that shares a characteristic with the user. The object type 847 indicates the type of business object for which access control information is to be generated. In the rule data structure 840, the user group identifier 843 and the object type 847 provide additional filters to reduce the amount of data that is processed when access control information is generated or modified. The indication of permitted action 857 identifies the permitted action or actions that may be performed on the particular business object to which a user is permitted access. The indication of permitted action 846 indicates a right or rights, such as particular types of data operations (including read, write and delete) or other types of rights, as previously described with respect to FIG. 2.

The optional business object filter criteria 848 identifies filter criteria or a filter criterion to limit the business objects to which the access control rule applies. The user of such a filter may reduce the number of business objects to be processed when generating access control information, which, in turn, help improve the efficiency of generating access control information. Some implementations may allow a user to identify the business object filter criteria 848 when the rule is created or modified. In such a case, the business object filter criteria 848 can be applied programmatically each time access control information is generated for the rule. This may be referred to as the programmatic identification of business object filter criteria 848. Alternatively, in some implementations, when initiating the generation of access control information for a rule, a user may indicate an optional business object filter criteria 848 to be used. This may be referred to as the interactive identification of business object filter criteria 850. In some implementations, a user may be able to identify the business object filter criteria 850 either programmatically or interactively.

Similarly, the optional user filter criteria 849 identifies filter criteria or a filter criterion to limit the user information records to which the access control rule applies. A user may be able to identify the user filter criteria 849 programmatically, interactively, or both programmatically and interactively.

The characteristic method data structure 850 includes a rule identifier 851, a characteristic type 853, a method 855 for determining a user characteristic, a method 857 for determining a business object characteristic, an optional business object filter criteria 857, and an optional user filter criteria 858. The characteristic method identifier 851 uniquely identifies a characteristic method entry in the characteristic method data structure 850. The characteristic method identifier 850 may be used with the characteristic method identifier 845 of the rule data structure 850 to associate a particular characteristic method with a particular rule, as illustrated by link 852.

The characteristic type 853 indicates the type of characteristic that is shared by a user and a business object that a user is permitted access. In some implementations, the characteristic type 846 may be used to provide context to the system administrator or other type of user that is creating and maintaining access control rules. For example, a user may be able to easy identify the rules that apply to a particular type of characteristic.

The method 855 for determining a user characteristic identifies a script, module, method, computer program or another type of executable instructions that indicate how to determine user characteristic that is necessary to access a business object having the same characteristic. Similarly, the method 856 for determining a business object characteristic identifies a script, module, method, computer program or another type of executable instructions that indicate how to determine a business object characteristic on which access is to be permitted. The use of a method enables the definition of more complex relationships between users and characteristics (and business objects and characteristics) than otherwise may be possible through the use of a characteristic alone, as described previously in FIG. 2. While the use of a method may be useful, the invention is not limited to the use of a method to define a user characteristic and/or a business object characteristic. The optional business object filter criteria 857 and the optional user filter criteria 858 are substantially the same as the optional business object filter criteria 848 and the optional user filter criteria 849 of the rule data structure 840.

In some implementations, the rule data structure 850 and the characteristic method data structure 850 may be included in a single access control rule data structure. Moreover, some implementations may persistently store the rule data structure and the characteristic method data structure as separate data structures but create a single rule-characteristic-method data structure for use in generating access control information. The rule data structure 840, the characteristic method data structure 850, or both the rule data structure 850 and the characteristic method data structure 850 may be referred to as an access control rule data structure.

Figure 9:
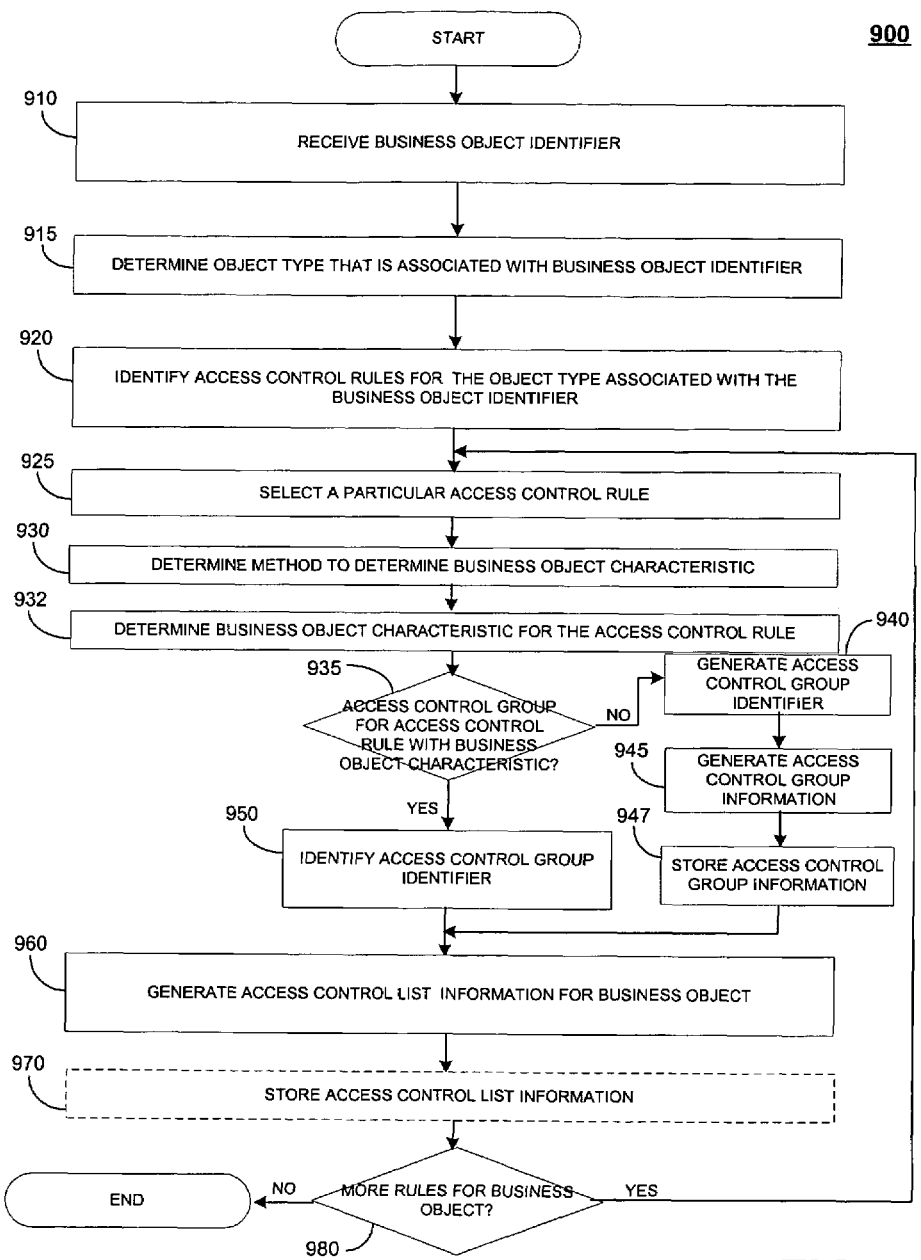

FIG. 9 depicts an example process 900 that uses access control rules to generate access control list information and access control group information that may be used to manage access control to particular business objects. The access control rules used may be, for example, an implementation of the rule data structure 840 and the characteristic method data structure 850 in FIG. 8. The generated access control list information and the access control group information may be, for example, and implementation of access control list 760 and access control group information 750, both in FIG. 7. In contrast to process 300 in FIG. 3, the process 900 only generates a portion of access control information. More specifically, the process 900 generates access control information that relates to a particular business object. Access control information that relates to a user is generated by another process, such as process 1000 of FIG. 10.

The process 900 is performed, for example, when a new business object is added to the business application to which the access control information applies. The process 900 may be initiated by a user when a new business object is added or may be initiated programmatically based on a predetermined schedule (such as nightly or weekly).

The process begins when a business object identifier is received (step 910). The processor determines the object type that is associated with the business object identifier (step 915). The object type of the received business object identifier, for example, may be determined by accessing the business object information that corresponds to the received business object identifier (as illustrated in FIG. 2).

The processor identifies an access control rule or multiple access control rules for the object type associated with the business object identifier (step 920). This may be accomplished, for example, by accessing access rule information 840 and identifying access rules that have an object type identifier 847 that corresponds to the object type of the business object for which access control information is to be generated. When more than one access control rule is identified, the processor selects one of the identified access control rules (step 925).

The processor determines a method to determine the business object characteristic to be used for the identified access control rule (step 930). For example, the processor may identify the method 856 to determine the business object characteristic for the characteristic method entry in the characteristic method data structure 950 that corresponds to the characteristic method identifier 845 in the access control rule 840 being processed.

The processor then determines the business object characteristic for the access control rule (step 932). This may be accomplished, for example, by the processor executing the method 856 to determine the business object characteristic previously identified.

The processor then determines whether an access control group in access control information 750 corresponds to the identified access control rule and the identified business object characteristic (step 935). This may be accomplished, for example, by determining whether the rule identifier 841 of the access control rule 840 and the business object characteristic identified by the method 856 correspond to an access control rule identifier 755 and the characteristic 753, respectively, in a record of the access control group information 750. A record in the access control group information 750 may be referred to as an access control group.

When the access control group does not exist in the access control group information 750 (step 935), the processor generates a unique access control group identifier. For example, the processor may generate an identifier using a proprietary key numbering system in which identifiers are created by sequentially allocating numbers within an predetermined number range. In another example, the processor may generate an identifier that uses a GUID ("globally unique identifier") key that is produced from a well-known algorithm. The processor also generates other access control group information including a characteristic 753 that corresponds to the business object characteristic identified by the method 856 and an access control rule identifier 755 that corresponds to the access control rule identifier 841 of the selected access control rule (step 945). The processor then stores the access control group (step 947). By contrast, when an existing access control group corresponds to the business object characteristic and the access control rule (step 935), the processor identifies the access control group identifier 751 for the record in the access control group information 750.

Whether access control group information has been accessed (step 950) or generated (step 945), the processor next generates access control list information for the business object (step 960). This may be accomplished, for example, when the processor generates a record for the access control list 760 by using the access control group identifier 761 that has been previously identified (in step 950) or generated (in step 945). The generated access control list record also includes a business object identifier 763 that corresponds to the received business object identifier and an indicator of permitted action 765 that corresponds to the indicator of permitted action 846 of the rule data structure 840 that corresponds to the selected access control rule 840. Optionally, the generated access control list information may be stored in persistent storage (step 970).

The processor determines whether there are more access control rules for the business object (step 980), and, if so, selects another access control rule to process (step 925) and continues as described above. When the processor determines that there are not more access control rules for the business object (step 980), the process 900 ends.

Figure 10:
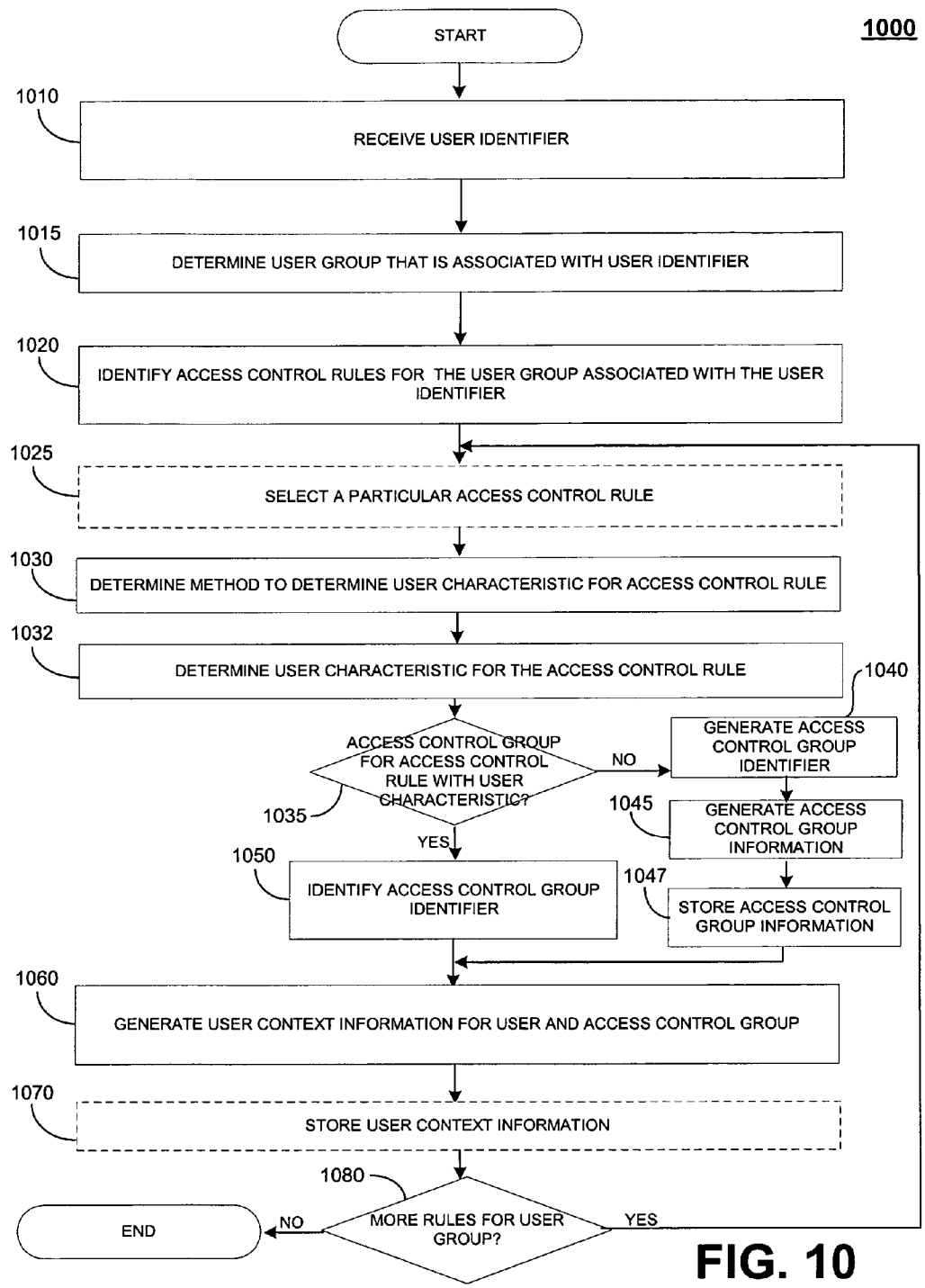

FIG. 10 illustrates an example process 1000 that generates user context information and access control group information that may be used to manage access control to particular business objects. The generated user context information and the access control group information may be, for example, an implementation of user context information 740 and access control group information 750, both in FIG. 7. The access control rule information may be, for example, an implementation of the rule data structure 840 and the characteristic method data structure 850, both in FIG. 8. The process 1000 may be performed by a processor on a computing system, such as the computer system 110 of FIG. 1. The processor is directed by a method, script, or other type of computer program that includes executable instructions for performing the process 1000. Like process 900 of FIG. 9 and in contrast to process 300 in FIG. 3, the process 1000 only generates a portion of access control information. More specifically, the process 1000 generates access control information that relates to a particular user.

The process 1000 may be performed, for example, when a user is given access to the business application to which the access control information applies. In some implementations, the process 1000 is performed each time that a user logs into or otherwise initiates the business application. The process 1000 also may be performed, for example, the first time during a day, or the first time during particular day, that a user logs into the business application. Alternatively, the process 1000 may be performed on a periodic basis, such as each night or each week. Additionally or alternatively, the process 1000 may be initiated by a system administrator or another type of user when the user determines that the process 1000 should be performed.

The process begins when a user identifier is received (step 1010). The processor determines a user group that is associated with the user identifier (step 1015). For example, the processor accesses user information, such as user information 200 in FIG. 2, to determine a user group identifier 213 associated with a user identifier 211 that corresponds to the received user identifier.

The processor identifies an access control rule or multiple access control rules for the user group associated with the user identifier (step 1020). This may be accomplished, for example, by identifying an access rule information 840 rule that has a user group identifier 843 that corresponds to the user group associated with the user identifier. When more than one access control rule is identified for a received user group, the processor selects one of the identified access control rule (step 1025).

The processor then determines a method to determine the user characteristic for the access control rule (step 1030). To do so, for example, the processor identifies the method 855 to determine a user characteristic in the characteristic method data structure 850 has a characteristic method identifier 851 that corresponds to the characteristic method identifier 845 in the access control rule 840 being processed.

The processor determines a user characteristic to be used for the access control rule (step 1032). For example, the processor may execute the identified method 855 to identify the characteristic for the user.

The processor then determines whether an access control group in access control information 750 corresponds to the identified access control rule and the identified user characteristic (step 1035). This may be accomplished, for example, by determining whether the rule identifier 841 of the access control rule 840 and the user characteristic identified by the method 855 correspond to an access control rule identifier 755 and the characteristic 753, respectively, in a record (that is, an access control group) in access control group information 750.

When an access control group does exist (step 1035), the processor generates a unique access control group identifier (step 1040), as described previously in FIG. 9. The processor also generates access control group information, including a characteristic 753 that corresponds to the identified user characteristic and an access control rule identifier 755 that corresponds to the selected access control rule (step 1045). Optionally, the processor stores the access control group information in persistent storage (step 1047). When an existing access control group corresponds to the user characteristic and the access control rule (step 1035), the processor identifies the access control group identifier 751 for the record in the access control group information 750 (step 1050), as described previously in FIG. 9.

Whether access control group information has been accessed (step 1050) or generated (step 1045), the processor also generates user context information for the user (step 1060). This may be accomplished, for example, when the processor generates a record for the user context information 740 having an access control group identifier 741 that corresponds to the access control group identifier 761 that has been previously identified (in step 1050) or generated (in step 1045). The user context record also includes a user identifier 742 that corresponds to the received user identifier. Optionally, the generated user context record may be stored in persistent storage (step 1070).

The processor determines whether there are more access control rules for the user group (step 1075), and, if so, selects another access control rule to process (step 1020) and continues as described above. When the processor determines that there are not more access control rules for the user group (step 1075), the process 1000 ends.

Figure 11A:
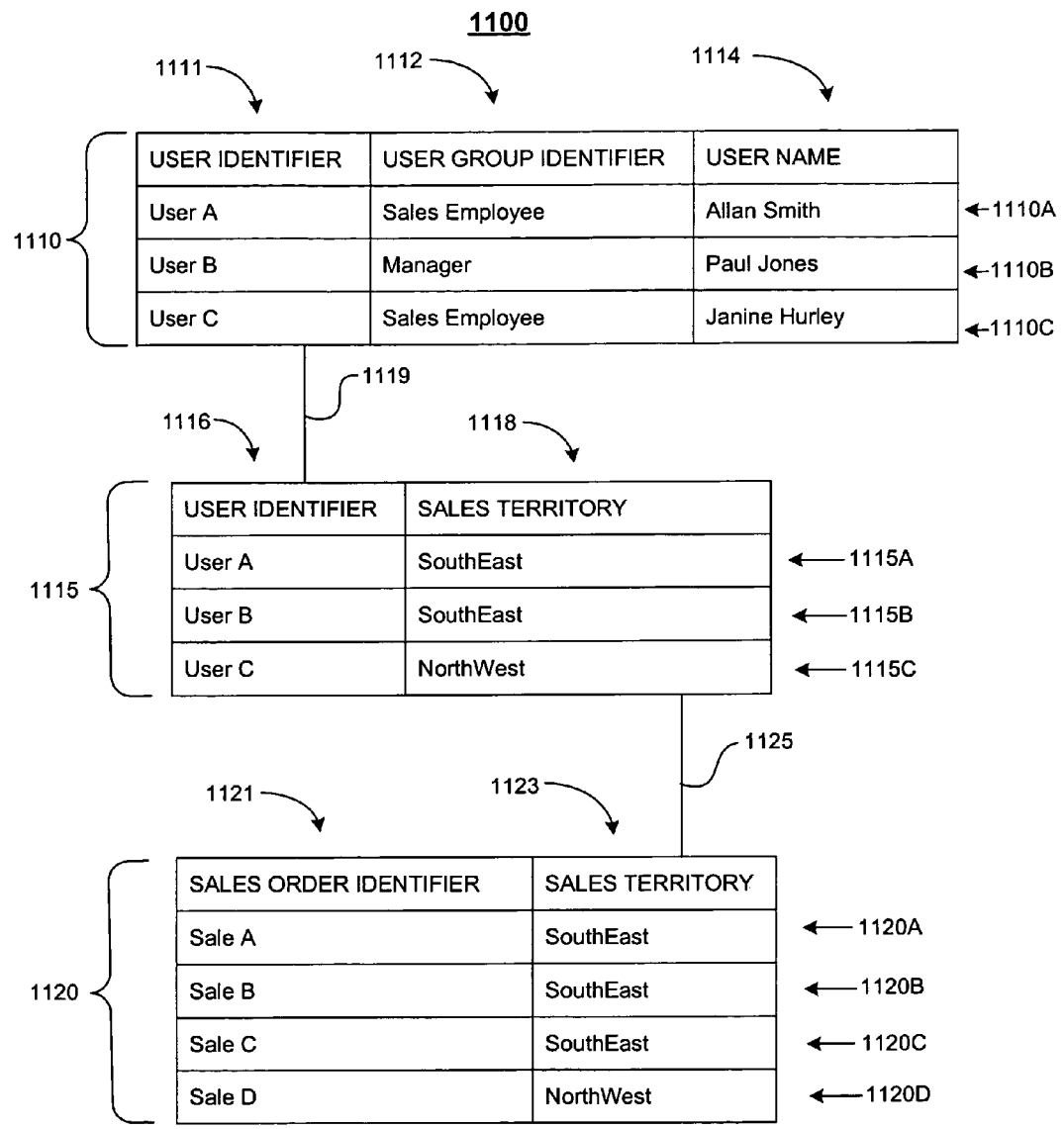
Figure 11B:
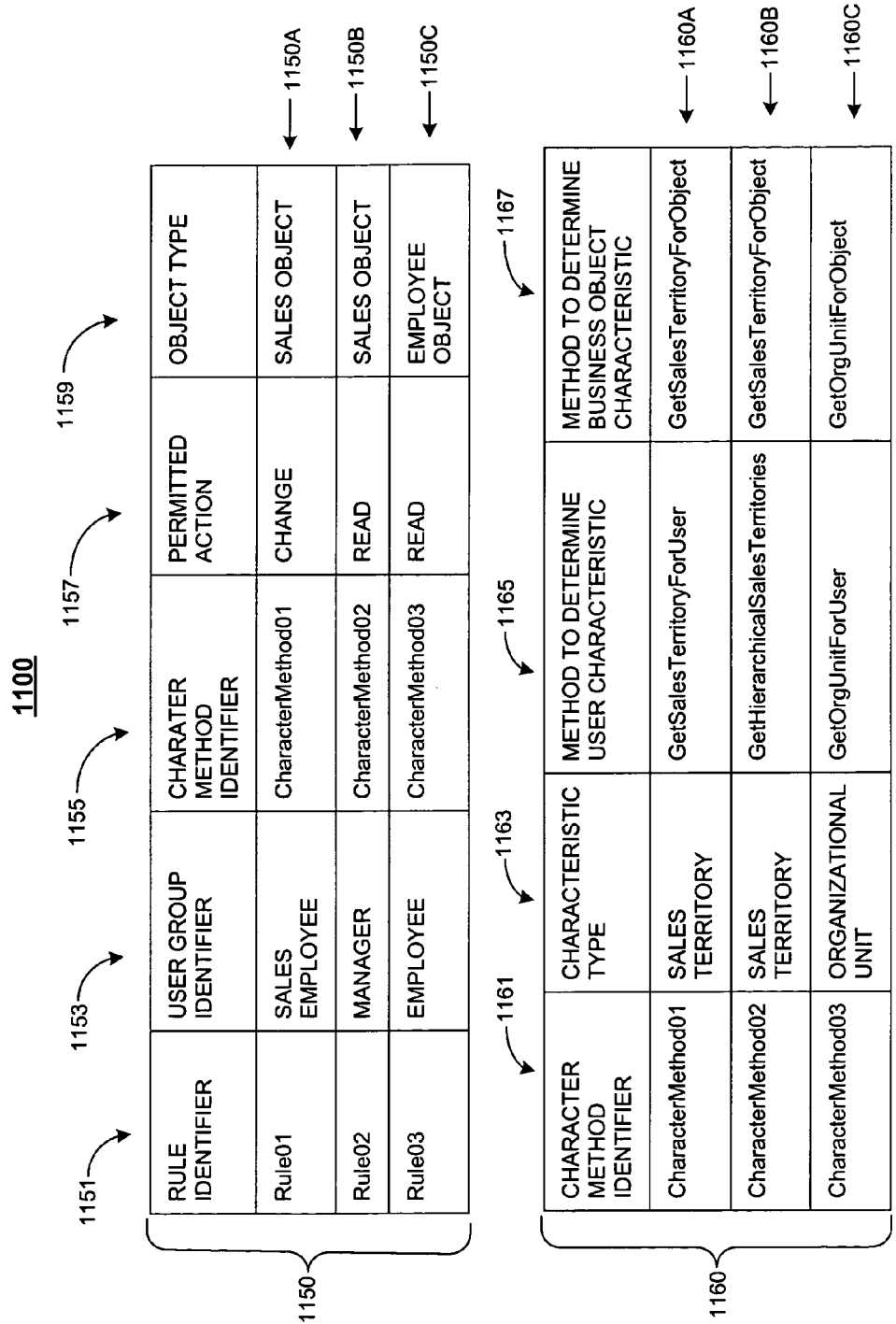
Figure 12:
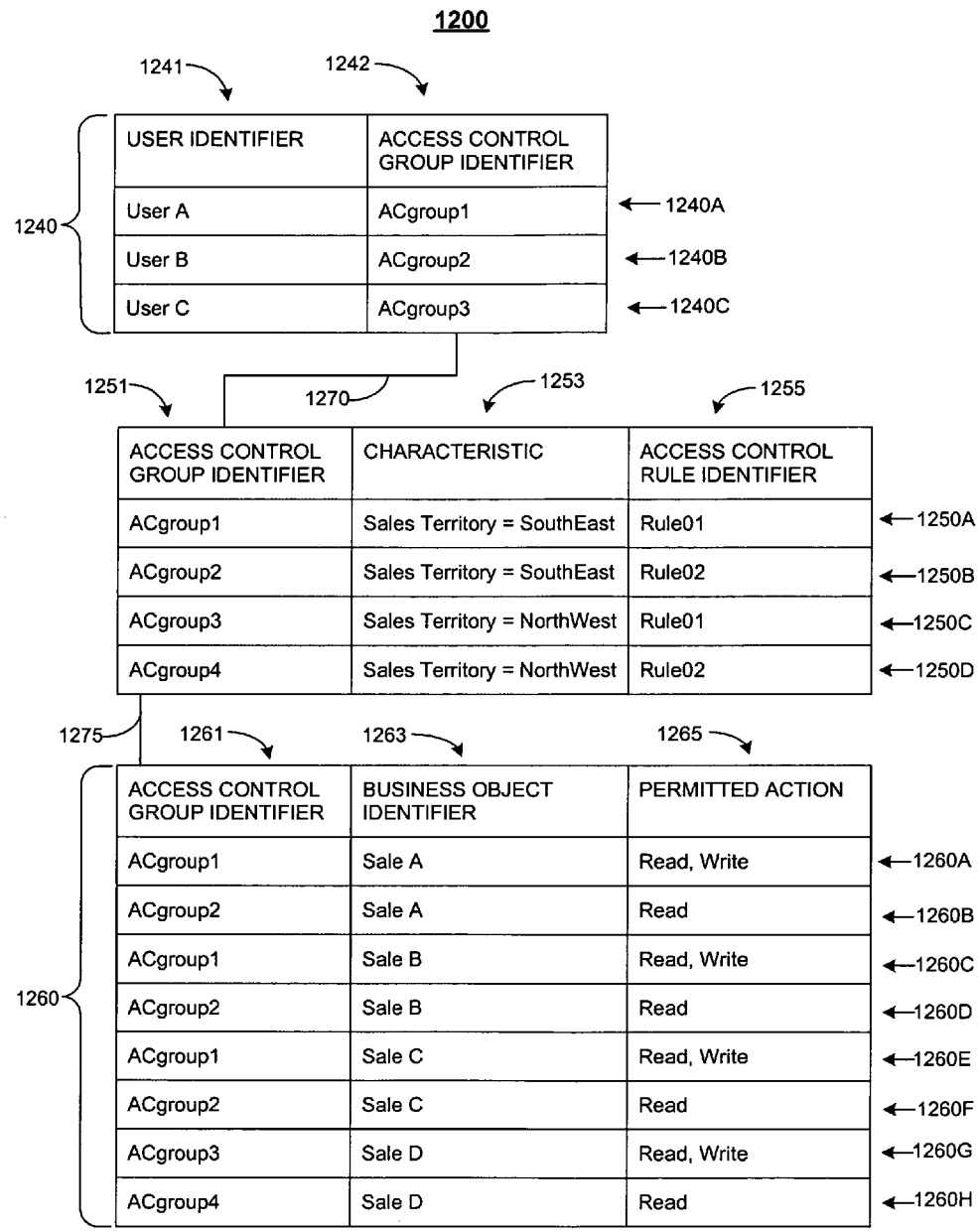

FIG. 11A represents a sample 1100A of user information and business object information, and FIG. 11B represents a sample 1100B of access control information that is used to illustrate the generation of access control information. FIG. 12 depicts the generated access control information 1200 of the samples 1100A and 1100B.

Referring to FIG. 11A, the sample 1100A is stored in a relational database system that logically organizes data into database tables. The database tables arranges data associated with an entity (here, a user, a user assignment or a sales order) in a table or tables. The sample 1100A shows a portion of a user table 1110, a portion of a user group table 1115 and a portion of a sales order table 1120.

The user table 1110 arranges data associated with a user into a series of columns 1111, 1112 and 1114, and rows 1110A-1110B. Each column 1111, 1112 and 1114 describes an attribute of a user for which data is being stored. Each row 1110A-1110B represents a collection of attribute values for a particular user identifiable by a user identifier 1111. The attributes include the user group identifier 1112 that is associated with a particular user and a user name 1114 of the particular user.

The user assignment table 1115 arranges data associated with a user assignment into a series of columns 1116 and 1118, and rows 1115A-1115C. Each column 1116 and 1118 describes an attribute of a user assignment for which data is being stored. Each row 1115A-1115B represents a collection of attribute values for a particular assignment for a particular user who is identifiable by a user identifier 1116. The attributes include the sales territory 1118 for which a particular user is responsible—that is, the user assigned to the sales territory 1118.

The sales territory to which a user is assigned may be determined by using the user identifier 1111 to identify a sales territory record in sales territory table 1115 that has a corresponding user identifier 1116, as represented by link 1119. For example, "User A" of row 1110A in the user information table 1110 is responsible for the "SouthEast" sales territory 1118. This may be determined by identifying the sales territory row 1115A that has a user identifier 1116 that corresponds to the "User A" user identifier 1111 in the user information table 1110.

The sales order table 1120 arranges data associated with a user assignment into a series of columns 1121 and 1123, and rows 1120A-1120D. Each column 1121 and 1123 describes an attribute of a sales order for which data is being stored. Each row 1120A-1120D represents a collection of attribute values for a particular sales order identifiable by a sales order identifier 1121. The attributes include the sales territory 1123 in which the sales order was placed.

The user responsible for a particular sales order may be determined by using the sales territory attribute 1123 to identify the users assigned to a particular sales territory, as reflected in the user assignment table 1115. This is reflected in link 1125. For example, "Sale A" of row 1120A in the sales order table 1120 occurred in the "SouthEast" sales territory 1123, according to row 1120A. The users assigned to the "SouthEast" sales territory 1123 may be determined by identifying the user assignment rows 1120A and 1120B that have "SouthEast" sales territory assignments as identified by attribute 1118 in the user assignment table 1115.

Referring to FIG. 11B, the sample 1100B is stored in a relational database system that logically organizes data into database tables. The database tables arranges data associated with the access control rules and characteristic methods into two tables. The sample 1100B shows a portion of a rule table 1150 and a portion of a characteristic method table 1160.

The rule table 1150 arranges data associated with an access control right into a series of columns 1151-1159 and rows 1150A-1150C. Each of columns 1151-1159 describes an attribute of an access control right for which data is being stored. Each row 1150A-1150C represents a collection of attribute values for a particular access control rule identifiable by the rule identifier 1151. The attributes include a user group identifier 1153, a characteristic method identifier 1155, an indication 1157 of permitted action, and an object type 1159, as described previously with respect to rule information 840 in FIG. 8.

The characteristic method table 1160 arranges data associated with a method to determine a characteristic into a series of columns 1161-1167 and rows 1160A-1160C. Each column of columns 1161-1167 describes an attribute of an access control rule for which data is being stored. Each row 1160A-1160C represents a collection of attribute values for a particular characteristic method identifiable by the characteristic method identifiers 1161. The attributes include an a characteristic type 1163, a method 1165 to determine a user characteristic, and a method 1167 to determine a business object characteristic, as described previously with respect to characteristic method information 850 in FIG. 8.

Referring to FIG. 12, the results 1200 of generating access control information are stored in a relational database system that logically organizes data into a user context table 1240, an access control group table 1250 and an access control list table 1260, that are substantially the same as the user context information 740, the access control group information 750 and the access control list information 760 in FIG. 7.

The user context table 1240 arranges access data associated with a user into a series of columns 1241 and 1242 and rows 1240A-1240C. Each column 1241 and 1242 describes an attribute of a user context data being stored. Each row 1240A-1240C represents a collection of attribute values for a particular user identifiable by a user identifier 1241. The attributes include the user identifier 1241 that is associated with a particular user and an access control group identifier 1242 that associates the corresponding records in the user context table 1240, the access control group table 1250 and the access control list table 1260, as described previously with respect to FIG. 7.

The access control group table 1250 arranges access data into columns 1251, 1253 and 1255 and rows 1250A-1250D. Column 1251 describes an access control group identifier 1251. Column 1253 describes the characteristic attribute 1253, and access control rule identifier 1255 identifies a corresponding record in the access control rule table 1150 that was used to generate the access control group identified by the access control group identifier 1251. Each row 1250A-1250D represents a collection of attribute values for a particular access control group identifiable by the access control identifier 1251.

The access control list table 1260 arranges access data into columns 1261, 1263 and 1265, each of which describes an attribute, and rows 1260A-1260H. Each row 1260A-1260H represents a collection of attribute values for a particular access control group identifiable by the access control identifier 1261. The attributes include a business object identifier 1263 and an indicator 1265 of permitted actions.

An entry in the user context table 1240 is related to an entry in the access control group table 1250 through the access control group identifiers 1242 and 1251, as shown by link 1270. Similarly, an entry in the access control group table 1250 is related to an entry in the access control list table 1260 through the access control group identifiers 1251 and 1261, as shown by link 1275.

Referring also to FIG. 9, in one example, the business object identifier 1121 (here, a sales order identifier) of row 1120A in the sales order table 1120 is received (step 910). Here, the business object identifier 1121 corresponds to "Sale A." The processor determines that the business object type is a "Sales Object" based on the type of business object identifier received (step 915). The processor identifies rows 1150A and 1150B in the access control rule table 1150 as being associated with the object type "Sales Object" based on the object type attribute 1159 having a value of "Sales Object" in those rows (step 920). The processor selects the first row 1150A of the identified rows 1150A and 1150B (step 925).

The processor determines the method record 1155 as identified in the access control rule table 1150 to determine the business object characteristic for the object type 1159 of "Sales Object" (step 930). Here, the processor identifies two methods for the object type as shown in rows 1150A and 1150B. However, in this case, the two rows both use the same method 1167 to determine a business object characteristic, as shown by the "GetSalesTerritoryForObject" method in the characteristic method table 1160.

The processor uses the method 1167 identified in row 1160A to determine the business object characteristic for the "Sale A" sales object (step 930). The processor executes the "GetSalesTerritoryForObject" method 1167 identified in row 1160A to determine that the characteristic of the business object is "SouthEast," based on row 1120A of Sales Object 1120 that has a sales territory 1123 value of "SouthEast."

Assuming that no access control groups have yet been determined for the "Sale A" sales object associated with the "SouthEast" sales territory (step 935), the processor generates a unique access control group identifier (here, "ACgroup1")(step 940). The processor also generates the characteristic attribute 1253 of "SouthEast" based on the results of executing the method 1167 for the business object identifier "Sale A." The processor generates the access control rule identifier 1255 of "Rule01" based on the rule identifier 1151 of the access control rule (here, row 1150A) previously selected from the access control table 1150 (step 945). The access control group information is stored in row 1250A of the access control group table 1250.

The processor then generates access control list information for the "Sale A" sales object (step 960). This is accomplished by using the access control group identifier "ACgroup1" that was generated as the access control group identifier 1261, the received business object identifier "Sale A" as the business object identifier 1263, and the permitted action 1157 "Change" of row 1150A in the rule table 1150 (that corresponds to the rule identifier 1155 for access control rule "Rule01" that is being processed) as the permitted action attribute 1265. The processor transforms the "Change" permitted value into the database operations of "Read, Write" which are the attributes associated with permitted action attribute 1265. The transformation may be accomplished using processing logic that maps one or more values of permitted action 1157 in the rule table 1150 to one or more values of permitted action 1265 in the access control list table 1260. The generated access control list information is stored in row 1260A of the access control list table 1260.

The processor determines that another access control rule applies to the object type "Sales Object" (here, Rule02 in row 1150B of access control rule table 1150) (step 980) and selects that rule for processing (step 925). The result of the processing of Rule02 is row 1250B being stored in the access control group table 1250 and the row 1260B being stored in the access control list table 1260.

The rows 1250C and 1250D in the access control table 1250 and the rows 1260C-1260H in the access control list table 1260 result from using the process 900 to generate access control information for the sales objects 1120B-1120D stored in sales object table 1120.

Referring also to FIG. 10, the user identifier 1111 of row 1110A in the user table 1110 is received (step 1010). Here, the user identifier 1111 has a value of "User A." The processor determines that the user identifier is associated with the user group identifier 1112 (here, "Sales Employee") (step 1015). By finding a corresponding user group identifier 1153 of "Sales Employee" in row 1150A of the rule table 1150, the processor identifies row 1150A in the access control rule table 1150 as being associated with the value of the user group identifier 1112 (also "Sales Employee") of the user.

The processor then identifies the method to use to determine a user characteristic (step 1020). To do so, the processor uses the characteristic method identifier 1155 in the rule table 1150 to identify a particular characteristic method in the characteristic method table 1160 that has a corresponding value for the characteristic method identifier 1155 in the rule table 1150.

The processor uses the method 1165 identified in row 1160A to determine the user characteristic for the "User A" user (step 1030). The processor executes the "GetSalesTerritoryForUser" method 1165 identified in row 1160A to determine that the characteristic of the user is "SouthEast." This is accomplished by accessing row 1115A of the user assignment table 1115. As illustrated by method 1165 identified in row 1160A, obtaining a characteristic on which the user-to-business-object relation is based may be a complex relation that is defined programmatically and is not limited to the definition of an attribute value that is occurs in the user record. Similarly, a characteristic of a business object is not limited to the attributes that are stored in the business object. A user characteristic may be any characteristic that is directly or indirectly related to a particular user, as a business characteristic may be any characteristic that is directly or indirectly related to a particular business object.

Assuming that the access control groups have been determined as described above with respect to FIG. 9, the processor accesses the access control group identifier 1255 in row 1250A (here, "ACgroup1") that is associated with (1) the characteristic 1253 that corresponds to the user characteristic identified using the method 1148 (here, the assignment of a user to the "SouthEast" sales territory) and (2) the access control rule identifier "Rule01" that corresponds to the access control rule being processed (step 1050). The processor then generates user context information for the "User A" user record (step 1060). This is accomplished by using the access control group identifier "ACgroup1" as the access control group identifier 1242 and the received user identifier "User A" as the user identifier 1241 of the user context information. The generated user context information is stored in row 1240A of the user context table 1240.

The processor determines that another access control rule does not apply to the user group "Sales Employee" that is associated with the received user identifier (step 1080) and ends the process 1000.

The rows 1240B and 1240C in the user context table 1240 result from using the process 1000 to generate user context information for the users that are represented by rows 1110B-1110C stored in user table 1110.

Figure 13:
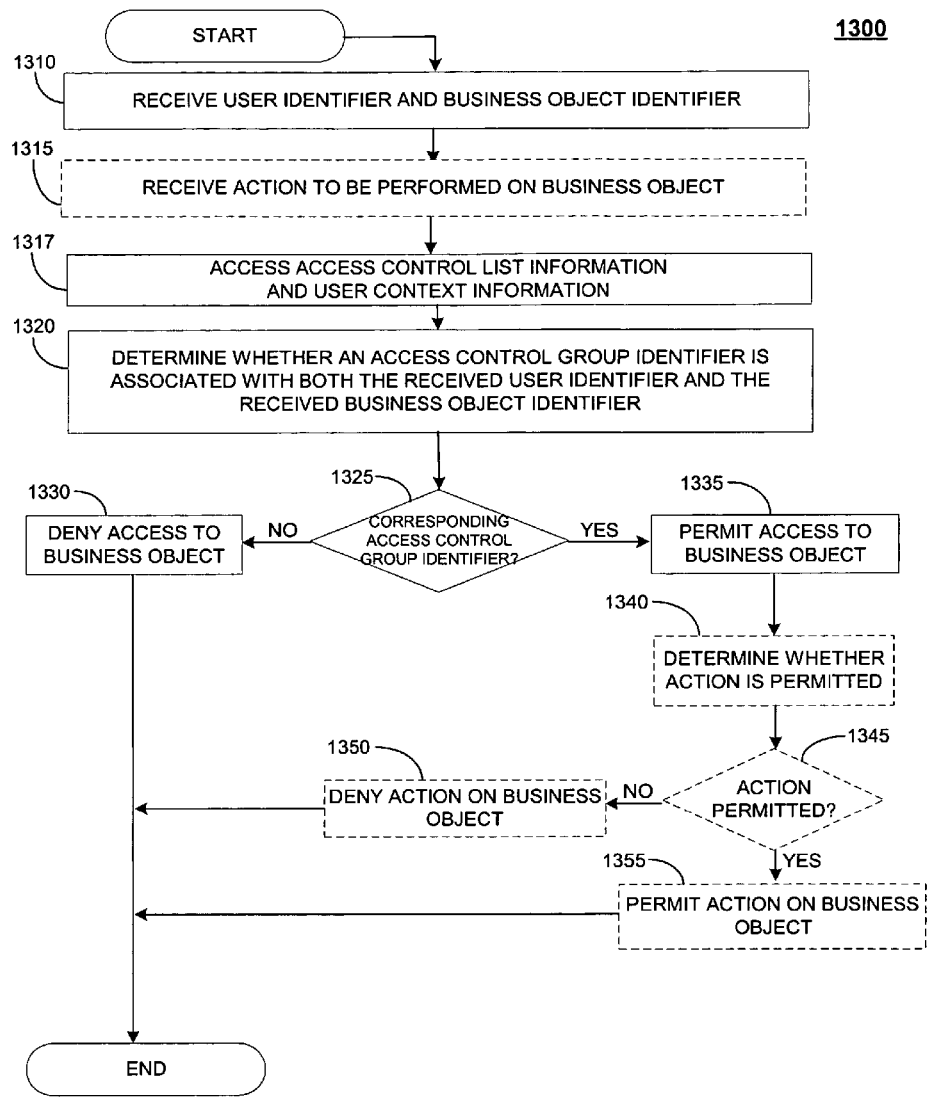

FIG. 13 depicts an example of a process 1300 that uses the access control information 1200 to determine whether a particular user is permitted to access a particular business object and to perform a particular action on the business object. The process 1300 may be performed by a processor on a computing system, such as the computer system 110 of FIG. 1. The processor is directed by a method, script, or other type of computer program that includes executable instructions for performing the check user access process 400. An example of such a collection of executable instructions is the check user access process 175 of FIG. 1.

The process 1300 is initiated by another computer program when a user seeks to access a particular business object. The processor receives a user identifier and a business object identifier (step 1310) and an optional action to be performed on the business object (step 1315), as described previously in FIG. 4. In one example, the user identifier "User A," the business object identifier "Sale A," and a request to read the business object is received.

The processor then accesses the access control list table 1260 and the user context table 1240 (step 1317). The processor does not need to access the access control group table 1250 when determining whether a user is permitted to access a particular business object. This may be useful because a process that accesses a smaller number of data tables often may be more efficient than a process that accesses that more data tables.

The processor then determines whether an access control group identifier is associated both with the received user identifier and the received business object identifier (step 1320). Some implementations may perform a database operation to join, based on matching values in the access control group identifier attributes 1242 and 1261, the access control list table 1250 with the user context table 1240. The resulting joined table may be used to identify an access control group identifier that is associated both with the received user identifier and the received business object identifier. Here, the row 1240A in the user context table 1240 and the row 1260A in the access control list table 1260 both contain the same access control group identifier (here, "ACgroup1"). This indicates that the received user ("User A") is permitted to access the received business object ("Sale A").

When such an access control group identifier is not found (step 1325), the user is not permitted to access the business object (step 1330) and the processor ends the process 1300. When the processor finds access control group identifier that permits the user to access the business object (step 1325) (as is the case for "User A"), the processor permits access to the business object (step 1335).

In this example, the processor then determines whether the received action of "Read" is permitted (step 1340). To do so, the processor determines whether the received permitted action of "Read" is included in the permitted action 1265 in row 1260A of the access control list table 1260. Here, the requested action "Read" is permitted (step 1345), so processor permits the action to occur on the business object (step 1355). If the requested action "Read" was not permitted (step 1345), the processor would not permit the action to occur on the business object. In either case, an indication whether the user is permitted to perform the requested action on the identified business object may be provided to the initiating software module or other type of executable software and the process 1300 ends.

Although the techniques and concepts described above refer to a business object for a business application operating on a computer system, the applicability of the techniques and concepts is not limited to that particular context. For example, the techniques and concepts may be applicable to accessing resources identified by a directory structure that are not associated with a business application. The techniques and concepts may be applicable to controlling access to another type of software, such as real-time software, scientific and engineering software, embedded software, and artificial intelligence software. Also, the techniques and concepts may be applicable to permitting access to particular attributes of a business object or collections of attributes of a business object.

A number of implementations of the invention have been described. Nevertheless, it will be understood that various modifications may be made without departing from the spirit and scope of the invention. Accordingly, other implementations are within the scope of the following claims.

What is claimed is:

1. A computer-readable storage medium comprising:
a data repository; and
executable instructions, wherein
the data repository includes:
access control rule data including access control rule entries, an access control rule entry identifying a characteristic method data entry, and
characteristic method data including characteristic method data entries, a characteristic method data entry relating to at least one entry in the access control rule data and identifying a method to determine a characteristic for a user and identifying a method to determine a characteristic for a data object; and
the executable instructions, when executed by a processor, perform operations comprising:
receiving an indication of a user;
receiving an indication of a data object;
accessing an access control rule data entry identifying a characteristic method data entry;
accessing the characteristic method data entry identified by the access control rule data entry, the characteristic method data entry identifying a method to determine a characteristic for a user and identifying a method to determine a characteristic for a data object;
determining the characteristic for the user by performing the method to determine the characteristic for the user identified by the characteristic method data entry;
determining the characteristic for the data object by performing the method to determine the characteristic for the data object identified by the characteristic method data entry; and
generating access control information that permits the user to access the data object conditioned on the characteristic for the user being the same as the characteristic for the data object.

2. The medium of claim 1 wherein the data repository further includes user data.

3. The medium of claim 2 wherein at least one entry in the characteristic method data identifies a method to determine a user characteristic associated with at least one entry in the user data.

4. The medium of claim 3 wherein at least one entry in the access control rule data includes an indication of a criterion for use in eliminating at least one entry in the user data when using the method to determine a user characteristic.

5. The medium of claim 3 wherein at least one entry in the characteristic method data includes an indication of a criterion for use in eliminating at least one entry in the user data when using the method to determine a user characteristic.

6. The medium of claim 1 wherein the data repository further includes data object data.

7. The medium of claim 6 wherein at least one entry in the characteristic method data identifies a method to determine a data object characteristic associated with at least one entry in the data object data.

8. The medium of claim 6 wherein at least one entry in the characteristic method data includes an indication of a criterion for use in eliminating at least one entry in the data object data when using the method to determine a data object characteristic.

9. The medium of claim 6 wherein at least one entry in the access control rule data includes an indication of a criterion for use in eliminating at least one entry in the data object data when using the method to determine a data object characteristic.

10. An apparatus comprising:
a data repository; and
executable instructions, wherein
the data repository includes:
access control rule data including access control rule entries, an access control rule entry identifying a characteristic method data entry, and
characteristic method data including characteristic method data entries, a characteristic method data entry relating to at least one entry in the access control rule data and identifying a method to determine a characteristic for a user and identifying a method to determine a characteristic for a data object; and
the executable instructions, when executed by a processor, perform operations comprising:
receiving an indication of a user;
receiving an indication of a data object; accessing an access control rule data entry identifying a characteristic method data entry;
accessing the characteristic method data entry identified by the access control rule data entry, the characteristic method data entry identifying a method to determine a characteristic for a user and identifying a method to determine a characteristic for a data object;
determining the characteristic for the user by performing the method to determine the characteristic for the user identified by the characteristic method data entry;
determining the characteristic for the data object by performing the method to determine the characteristic for the data object identified by the characteristic method data entry; and
generating access control information that permits the user to access the data object conditioned on the characteristic for the user being the same as the characteristic for the data object.

11. The medium of claim 1 wherein the method to determine the characteristic for the user comprises the method to determine the characteristic for the data object.

12. The medium of claim 1 wherein the method to determine the characteristic for the user is different than the method to determine the characteristic for the data object.

13. The medium of claim 1 wherein the access control rule data includes a first access control rule entry identifying a first characteristic method data entry and a second access control rule entry that is different than the first access control rule entry identifying the first characteristic method data entry.

14. The medium of claim 1 wherein the characteristic method data includes a first characteristic method data entry identifying a first method to determine a characteristic for a user and a second characteristic method data entry identifying a second method to determine a characteristic for a user, the first method being different than the second method.

15. The medium of claim 1 wherein the characteristic method data includes a first characteristic method data entry identifying a first method to determine a characteristic for a data object and a second characteristic method data entry identifying a second method to determine a characteristic for a data object, the first method being different than the second method.

* * * * *